(12) United States Patent
Powell et al.

(10) Patent No.: US 7,810,721 B2
(45) Date of Patent: Oct. 12, 2010

(54) SYSTEMS AND METHOD FOR VENDING MACHINE SETTLEMENT

(75) Inventors: John Powell, St. Louis, MO (US); Thomas Mark LeVake, Colorado Springs, CO (US)

(73) Assignee: Transaction Network Services, Inc., Reston, VA (US)

( * ) Notice: Subject to any disclaimer, the term of this patent is extended or adjusted under 35 U.S.C. 154(b) by 846 days.

(21) Appl. No.: 11/499,136

(22) Filed: Aug. 3, 2006

(65) Prior Publication Data
US 2007/0138265 A1 Jun. 21, 2007

Related U.S. Application Data

(60) Provisional application No. 60/705,956, filed on Aug. 4, 2005, provisional application No. 60/813,175, filed on Jun. 12, 2006.

(51) Int. Cl.
*G06F 7/08* (2006.01)
(52) U.S. Cl. .................. 235/381; 235/375; 235/379; 705/30; 705/39; 705/71
(58) Field of Classification Search ................ 235/381, 235/375, 379; 705/30, 39, 71
See application file for complete search history.

(56) References Cited

U.S. PATENT DOCUMENTS

| | | | |
|---|---|---|---|
| 4,412,292 A | 10/1983 | Sedam et al. | 364/479 |
| 4,570,228 A | 2/1986 | Ahlberg | 364/467 |
| 4,578,530 A * | 3/1986 | Zeidler | 705/71 |
| 4,650,978 A | 3/1987 | Hudson et al. | 235/380 |

(Continued)

FOREIGN PATENT DOCUMENTS

GB 2 143 981 2/1985

OTHER PUBLICATIONS

Sharp Develops and Releases DC2A1AZ001 Multi-Channel SS Wireless Unit, http://sharp-world.com, Mar. 23, 1999 (3 pages).

(Continued)

*Primary Examiner*—Allyson N Trail
(74) *Attorney, Agent, or Firm*—Mintz Levin Cohn Ferris Glovsky and Popeo PC

(57) ABSTRACT

The present invention relates to systems and methods for reconciliation or settlement of vending machine accounts. The present invention creates a transaction data packet having a transaction information for a credit transaction carried out on the vending device, where the vending device is configured to conduct a credit based vending transaction, forwards the transaction data packet for the credit transaction to a host processor, adds a host transaction identifier to the transaction data packet to create a modified transaction data packet for the transaction; sends the modified transaction data packet it to a merchant processor, receives an interim report from the merchant processor, calculates and applies individual interchange values to the transaction using stored rate table values, assigns a vending device identifier using the host transaction identifier to the modified transaction packet, identifies a correct time and date of a respective machine fill corresponding to the transaction on the vending device, forwards transaction information to a vending device route operator, and assigns the transaction to the vending device against a specific fill period for a total card transaction value and a card transaction value net merchant processor and association fees.

21 Claims, 32 Drawing Sheets

U.S. PATENT DOCUMENTS

| | | | | |
|---|---|---|---|---|
| 4,766,548 | A | 8/1988 | Cedrone et al. | 364/479 |
| 4,780,806 | A | 10/1988 | Wada et al. | 364/146 |
| 5,208,446 | A | 5/1993 | Martinez | 235/380 |
| 5,285,382 | A | 2/1994 | Muehlberger et al. | 364/401 |
| 5,352,876 | A * | 10/1994 | Watanabe et al. | 235/381 |
| 5,359,182 | A | 10/1994 | Schilling | 235/381 |
| 5,387,784 | A | 2/1995 | Sarradin | 235/380 |
| 5,408,513 | A | 4/1995 | Busch, Jr. et al. | 379/59 |
| 5,532,689 | A | 7/1996 | Bueno | 340/928 |
| 5,541,925 | A | 7/1996 | Pittenger et al. | 370/94.1 |
| 5,572,004 | A | 11/1996 | Raimann | 235/380 |
| 5,619,024 | A | 4/1997 | Kolls | 235/381 |
| 5,637,845 | A | 6/1997 | Kolls | 235/381 |
| 5,678,010 | A | 10/1997 | Pittenger et al. | 395/244 |
| 5,696,909 | A | 12/1997 | Wallner | 395/244 |
| 5,729,594 | A | 3/1998 | Klingman | 379/93.12 |
| 5,732,346 | A | 3/1998 | Lazaridis et al. | 455/406 |
| 5,822,216 | A | 10/1998 | Satchell, Jr. et al. | 364/479.01 |
| 5,844,808 | A | 12/1998 | Konsmo et al. | 700/244 |
| 5,862,183 | A | 1/1999 | Lazaridis et al. | 375/295 |
| 5,870,723 | A | 2/1999 | Pare, Jr. et al. | 705/39 |
| 5,920,847 | A | 7/1999 | Kolling et al. | 705/40 |
| 5,930,767 | A | 7/1999 | Reber et al. | 705/26 |
| 5,930,771 | A | 7/1999 | Stapp | 705/28 |
| 5,959,869 | A | 9/1999 | Miller et al. | 700/231 |
| 5,991,410 | A | 11/1999 | Albert et al. | 380/24 |
| 6,011,790 | A | 1/2000 | Fisher | 370/349 |
| 6,018,770 | A | 1/2000 | Little et al. | 709/223 |
| 6,056,194 | A | 5/2000 | Kolls | 235/381 |
| 6,061,557 | A | 5/2000 | Lazaridis et al. | 455/406 |
| 6,067,527 | A | 5/2000 | Lovell et al. | 705/21 |
| 6,075,796 | A | 6/2000 | Katseff et al. | 370/466 |
| 6,078,806 | A | 6/2000 | Heinonen et al. | 455/406 |
| 6,088,730 | A | 7/2000 | Kato et al. | 709/227 |
| 6,092,057 | A | 7/2000 | Zimmerman et al. | 705/44 |
| 6,119,053 | A | 9/2000 | Taylor et al. | 700/231 |
| 6,119,934 | A | 9/2000 | Kolls | 235/381 |
| 6,152,365 | A | 11/2000 | Kolls | 235/381 |
| 6,181,981 | B1 | 1/2001 | Varga et al. | 700/236 |
| 6,216,015 | B1 | 4/2001 | Hymel | 455/558 |
| 6,321,985 | B1 | 11/2001 | Kolls | 235/381 |
| 6,339,731 | B1 | 1/2002 | Morris et al. | 700/236 |
| 6,347,739 | B1 | 2/2002 | Tamam | 235/384 |
| 6,351,688 | B1 | 2/2002 | Nichols et al. | 700/241 |
| 6,457,038 | B1 | 9/2002 | Defosse | 709/200 |
| 6,462,644 | B1 | 10/2002 | Howell et al. | 340/5.92 |
| 6,505,095 | B1 | 1/2003 | Kolis | 700/244 |
| 6,886,742 | B2 | 5/2005 | Stoutenburg et al. | 235/379 |
| 7,076,329 | B1 * | 7/2006 | Kolls | 700/232 |
| 2001/0044293 | A1 | 11/2001 | Morgan | 455/405 |
| 2001/0049636 | A1 | 12/2001 | Hudda et al. | 705/26 |
| 2001/0056402 | A1 | 12/2001 | Ahuja et al. | 705/43 |
| 2002/0025796 | A1 | 2/2002 | Taylor et al. | 455/406 |
| 2002/0030579 | A1 | 3/2002 | Albert et al. | 340/5.9 |
| 2002/0046185 | A1 | 4/2002 | Villart et al. | 705/64 |
| 2002/0059148 | A1 | 5/2002 | Rosenhaft et al. | 705/77 |
| 2002/0065725 | A1 | 5/2002 | Manabe et al. | 705/16 |
| 2004/0117301 | A1 * | 6/2004 | Fujisawa et al. | 705/39 |
| 2004/0133474 | A1 | 7/2004 | Tami et al. | 705/16 |
| 2004/0133653 | A1 | 7/2004 | Defosse et al. | 709/217 |
| 2004/0159699 | A1 | 8/2004 | Nelson et al. | 235/379 |
| 2007/0255662 | A1 * | 11/2007 | Tumminaro | 705/79 |
| 2009/0055281 | A1 * | 2/2009 | DeMedio et al. | 705/21 |
| 2009/0076935 | A1 * | 3/2009 | Knowles et al. | 705/30 |
| 2009/0119190 | A1 * | 5/2009 | Realini | 705/30 |

OTHER PUBLICATIONS

VSAT A Tutorial, Apr. 6, 2002 www.donegal-holdings.com (4 pages).
How Serial Ports Work. Oct. 4, 2004 Printed from www.howstuffworks.com (5 pages).
How Wireless Internet Works, Apr. 10, 2002 Printed from www.howstuffworks.com (6 pages).
Information on VSATs, 2000, www.qpcomm.com (3 pages).
A Tutorial on VSATs, Oct. 4, 2002, www.anglefire.com (5 pages).
Lucent Technologies Unveils Wireless Solution for Bluetooth Applications, Dec. 14, 1999, www.lucent.com (3 pages).
VSAT Networks, Oct. 7, 2002, Multipoint Communications (8 pages).
DAMA-1000 VSAT Network, 1998 (8 pages).
SDLC Protocol, 2002 Copyright 22002, www.jbmelectronics.com/sdlc.htm (3 pages).
Communication Technology Fundamentals, M.R. Ogden, Nov. 23, 1998, http://66.91.152.34:8080/library/proceedings/fiji/presentation/ogden.
"Taxi & Livery Management", ITLA: The Year in Focus, dated Jan. 1992, p. 25.
"Taxi & Livery Management", 1993 Buyer's Guide, p. 32.
"Taxi & Livery Management", San Francisco Welcomes the ITLA in November, dated Oct. 1992, p. 29.
"Taxi & Livery Management", dated Jul. 1993, pp. 14 & 32.
Taxi & Livery Management, dated Jan. 1994.
Taxi & Livery Management, The Year in Review 1994, dated Jan. 1995, pp. 36 & 37.
Taxi & Livery Management, Buyers' Guide 1997, Spring 1997.
Taxi & Livery Management, Winter 1997.
Taxi & Livery Management, ITLA in New Orleans, Oct. 21-25, 1998.
Taxi & Livery Management, Summer 1999.
Taxi & Livery Management, 1999.
Taxi & Livery Management, 2000.
Allnet Devices, Wireless Vending machines Debut, INT Media Group, Incorporated, http//allnetdevices.co...ss/news/2000/10/06wireless_vending.html Oct. 6, 2000.
PCT International Search Report date of mailing Oct. 3, 2002.
PCT International Search Report date of mailing Apr. 20, 2004.
PCT International Search Report date of mailing Mar. 23, 2001.
Supplemental European Search Report date of mailing Feb. 7, 2006.

* cited by examiner

FIG. 1.

FIG. 9. Closing the Transaction Batch

Merchant Processor Funding

Funding Report

| | |
|---|---|
| Gross Sales | #######.## |
| Gross Processor Fees | #####.## |
| Gross Interchange Fees | #####.## |
| Gross Charge backs | ###.## |
| Net Due Merchant | ######.## |

FIG. 10.

Creating A "Cash" Vend Transaction

Recording A "Cash" Vend Transaction

Reconciling The Cash In A Vending Machine

Cash Removed = Product Added = DEX Meter Values

Recording A Card Vend Transaction
FIG. 17.
1702 ~ $ Vend Value +
1704 ~ $ Vend Count +
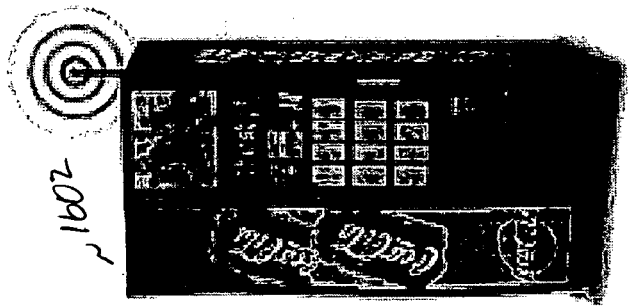
1602

FIG. 21.

Timing Problems

| Time Period | Activity | Machine Card Balance | Processor Batched Balance | Operator DEX Balance | Over (Short) |
|---|---|---|---|---|---|
| Monday 9:00 AM | New machine placed filled to par | $0.00 | $0.00 | $0.00 | $0.00 |
| Monday 11:59 | 25 card sales during the day | $25.00 | $0.00 | $0.00 | $0.00 |
| Tuesday 12:00 AM | Batch closes | $25.00 | $25.00 | $0.00 | $25.00 |
| Tuesday 11:50 PM | 30 new sales during the day | $55.00 | $25.00 | $0.00 | $35.00 |
| Wednesday 12:00 AM | Batch closes | $55.00 | $55.00 | $0.00 | $55.00 |
| Thursday 1:00 PM | 10 New sales for that part of the day | $65.00 | $55.00 | $0.00 | $55.00 |
| Thursday 1:10 PM | Machine filled DEX read. | $65.00 | $55.00 | $65.00 | ($10.00) |

Basic Retail Credit Card Terminal Batch Aggregation

SYSTEMS AND METHOD FOR VENDING MACHINE SETTLEMENT

CROSS-REFERENCES TO RELATED APPLICATIONS

This application claims priority to U.S. Provisional Patent Application No. 60/705,956, filed Aug. 4, 2005, and to U.S. Provisional Patent Application No. 60/813,175, filed Jun. 12, 2006, and incorporates disclosures of these applications herein by reference in their entirety. This application also relates to U.S. patent application Ser. No. 10/059,939, filed Jan. 29, 2002, and incorporates disclosure of this application herein by reference in its entirety.

BACKGROUND OF THE INVENTION

1. Field of the Invention

The present invention relates to a field of electronic transactions at vending machines and/or stations. Specifically, the present invention relates to settlement of accounts and transactions at vending machines.

2. Background

Traditional credit card processors do not currently break interchange fees down by individual transactions applied to individual machines by individual transaction time and date. This makes it nearly impossible for the vending machine host and the route operator to know the actual interchange rates going through a machine across a particular reporting period. Such information is crucial for the effective management in the vending route business.

Currently, some elements of the full service vending arm of the soft drink industry face a serious problem in reconciling the cash in vending machines that sell at multiple prices. Until very recently, full service bottler (machines that the soda bottler fill and settle themselves) sold vending machines at a single price, which enabled the following equation to work for settlement: Cash Removed=Product Filled=Machine Meter Values.

Until recently, most of those bottlers that read the machine values (DEX) did so manually, by pressing a re-set button inside the machine: the cash value would display on the front of the machine and the driver would write it down. This system of audits and controls worked only so long as the machine in question sold at a single price. More recently, bottlers introduced hand held devices to manually enter information. Again, auditing was dictated by balancing inventory filled to cash removed.

Today, there is a major marketing push to put products of different price points in the same machine. The key driving force behind this is the need to increase vend price as well as the multitude of premium priced products (e.g., water, Starbucks coffee, energy and natural juice health drinks, etc.). The problem is that there is not enough demand to put all of a single priced beverage in a single machine. While the bottling industry has responded with new glass front machines designed to merchandise up to 40 different products at many different prices, these machines cannot be deployed by some full service bottler operations because the current single price accounting and audit system cannot provide an acceptable audit control system for multiple priced machines. Moreover, the Sarbanes Oxley Act (SOX) now makes such control systems a necessity.

Thus, there is a need for a better system for reconciliation and settlement of a multiple vending machines capable of accepting cash and credit card payments for items vended. The system will keep accurate auditing of all transactions made using the vending machines and provide a funding report to the vendor identifying such transactions and sales made.

SUMMARY OF THE INVENTION

The present invention relates to systems and methods for reconciliation or settlement of vending machine accounts. In one embodiment of the present invention, a method for reconciling transactions for an unattended vending device is provided. The method includes creating a transaction data packet having a transaction information for a credit transaction carried out on the vending device, where the vending device is configured to conduct a credit based vending transaction. The method also includes forwarding the transaction data packet for the credit transaction to a host processor, adding a host transaction identifier to the transaction data packet to create a modified transaction data packet for the transaction, sending the modified transaction data packet it to a merchant processor, receiving an interim report from the merchant processor, calculating and applying individual interchange values to the transaction using stored rate table values, assigning a vending device identifier using the host transaction identifier to the modified transaction packet, identifying a correct time and date of a respective machine fill corresponding to the transaction on the vending device, forwarding transaction information to a vending device route operator, and assigning the transaction to the vending device against a specific fill period for a total card transaction value and a card transaction value net merchant processor and association fees.

In an embodiment of the present invention, a unique transaction identifier ("UTID") is used to reconcile or settle vending machine transactions. The UTID is assigned to each card transaction in the vending machine, which is sent to a third party credit clearing processor for processing. The third party credit processor can incorporate the UTID into settlement and funding reports that are sent back to the vending machine host and/or the route operator. The vending machine host can then use the UTID to rearrange transactions (e.g., electronic data management and/or reporting) by at least one of vending machine, by operator and by settlement period.

In another embodiment of the present invention, a method for reconciling transactions for a vending devices operated by a vending merchant is provided. The method includes creating a transaction data packet comprising transaction information for a credit transactions carried out on the vending device, forwarding the transaction data packet for the credit transaction to a host processor, adding a host transaction identifier and an applicable interchange code to the transaction data packet to create a modified transaction data packet for the transaction, calculating an interchange amount upon an applicable interchange code being included in the modified transaction data packet from a rate code category for the transaction, associating the transaction with a particular vending device using a corresponding vending device identifier, storing the transaction information, the transaction identifier, the interchange code, the interchange amount and the vending device identifier for the transaction in a transaction database, and assigning a closing date for the transaction.

In yet another embodiment of the present invention, a system for reconciling transactions in a plurality of unattended vending devices operated by a vending merchant is provided. The system includes a server operating software having computer instructions that enable receipt of a transaction data packet, the transaction data packet comprising transaction information for a credit transactions carried out on a vending device, adding a transaction identifier and an applicable interchange code to the transaction data packet to create a modified transaction data packet for the transaction, calculation of an interchange amount from a rate code category for the transaction, association of the transaction with the particular vending device using a corresponding vending device identifier, storage of the transaction information, the transaction identifier, the interchange code, the interchange amount and the vending device identifier for the transaction in a transaction database, and assignment of a closing date for each transaction.

BRIEF DESCRIPTION OF THE FIGURES

For a better understanding of the present invention, reference is made to the following description and accompanying drawings, while the scope of the invention is set forth in the appended claims.

FIG. 1 illustrates an exemplary system for reconciliation or settlement of vending machine accounts, according to the present invention.

FIG. 10 illustrates a conventional merchant processor funding report generated by the system in FIG. 9.

FIG. 17 illustrates a conventional system for recoding a credit-card-vend transaction.

FIG. 21 is table illustrating examples of issues associated with closing cash and credit card transactions in a vending machine.

DETAILED DESCRIPTION OF THE INVENTION

Figure 1:
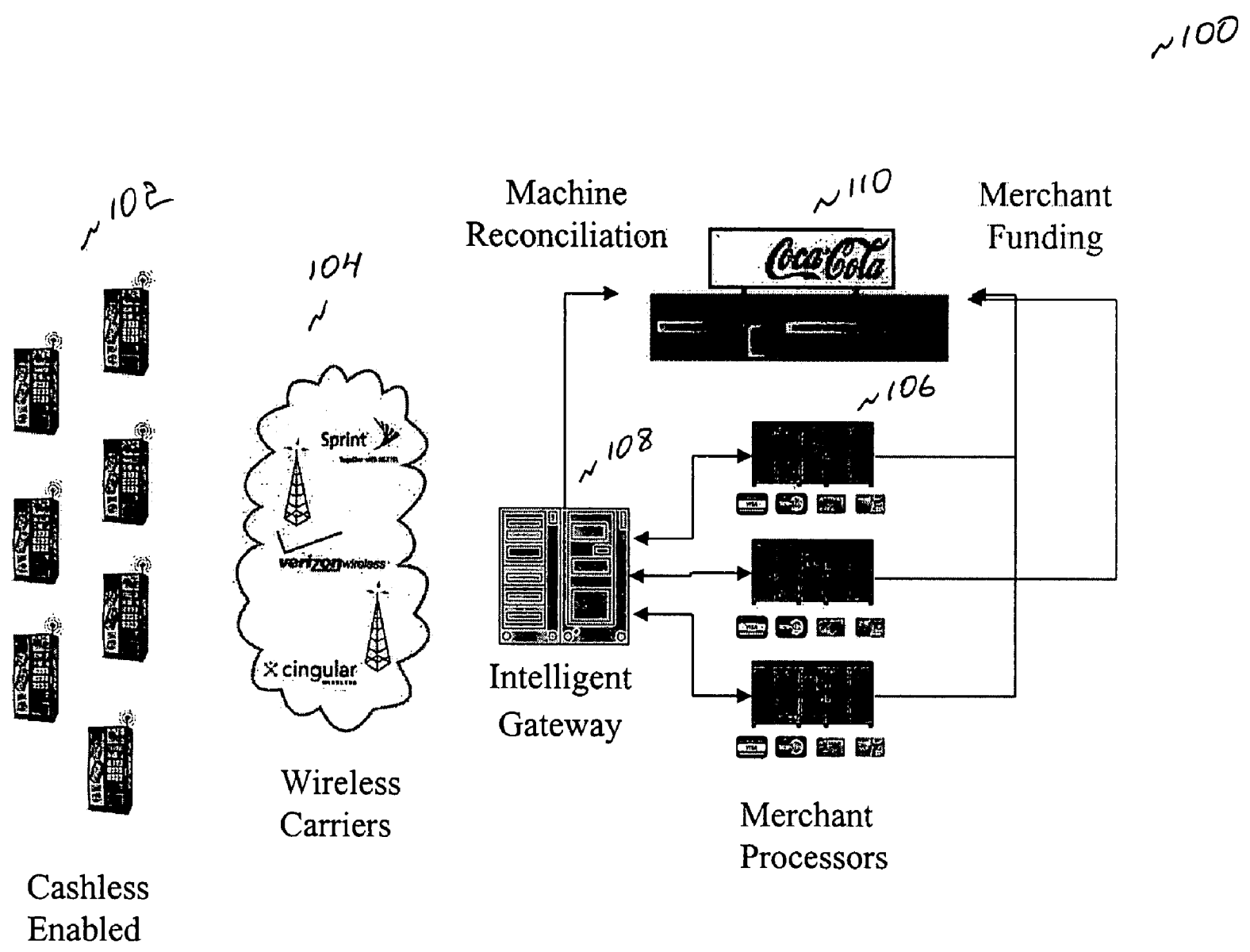
Figure 2:
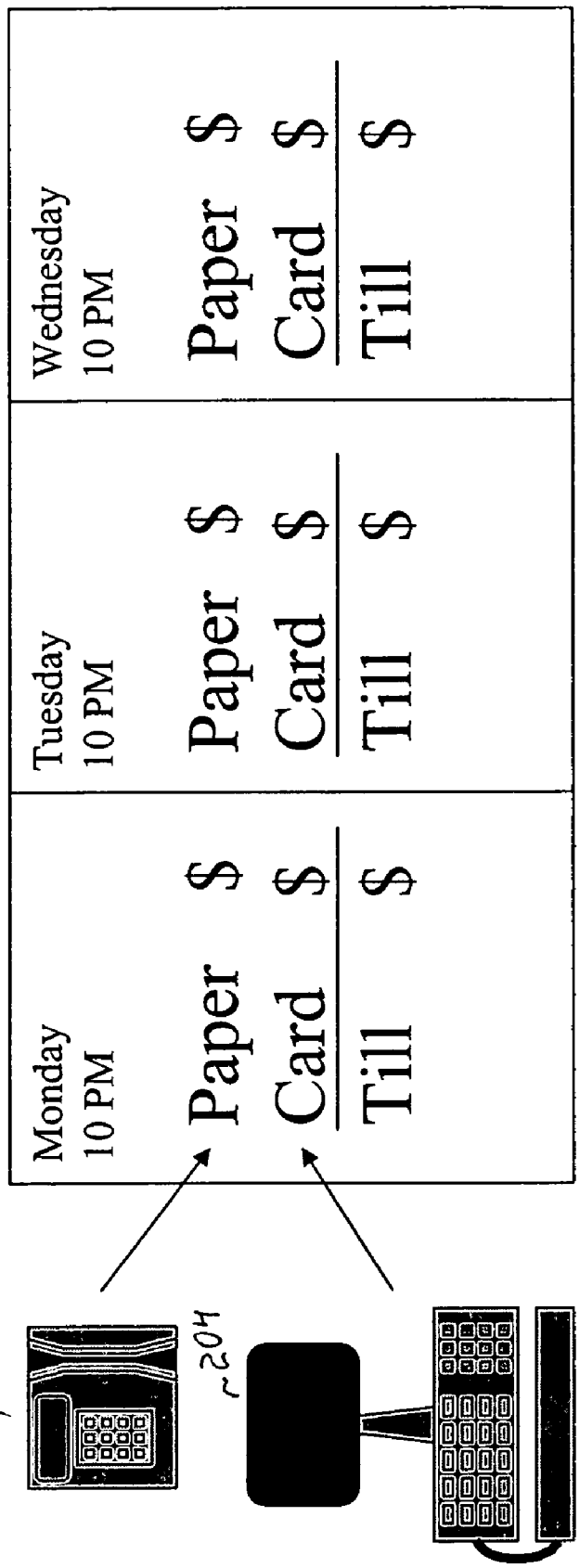
FIG. 2 illustrates a conventional system 200 for closing cash and credit card transactions at a point-of-sale terminal in a retail environment.

FIG. 1 illustrates a system 100 for reconciliation or settlement of vending machine accounts, according to the present invention. System 100 includes at least one vending machine 102, at least one wireless carrier 104, an intelligent gateway 108, at least one merchant processor 106, and a merchant vendor 110. The wireless carrier 104 provides a communications link between the vending machines 102 and the intelligent gateway 108. The intelligent gateway 108 communicates with merchant processors 106 and merchant vendor 110. Further, the merchant processors 106 are in communication with the merchant vendor 110.

The wireless carrier 104 can be any readily available wireless carrier capable of carrying signals between vending machines 102 and the intelligent gateway 108. Alternatively, the carrier 104 can be a wired or a wireline carrier. As can be understood by one having ordinary skill in the art, the present invention is not limited to the wireless, wired or wireline carriers.

The intelligent gateway 108 receives data from the vending machines 102 via carrier 104. The data includes vending machine meter data or DEX values for total cash value and credit card value. The values can be sent back to the merchant vendor to reconcile the gross card transaction with the reported values from the machine meters to provide an audit report.

Upon receipt of the data from the vending machine 102, the intelligent gateway 108 communicates this data to the merchant processor 106 and the merchant vendor 110. The data that the intelligent gateway 108 provides to the merchant processors 106 can include the type of transaction, item purchased and item's identifier, amount paid, credit card (or any other card, e.g., debit card, gift card, etc.) number, cardholder's name, machine identifier, merchant vendor identifier, and any other data. The data received by the merchant processors 106 is analyzed and compiled into an audit report. The audit report is sent back to the intelligent gateway 108 for forwarding to the merchant vendor 110 so that reconciliation or settlement of a specific vending machine 102 can be performed. The audit report or any other data can also be sent directly to the merchant vendor 110 for the purposes of merchant funding. Depending of the agreements between the merchant vendor 110 and the merchant processor 106, the merchant processor 106 provides funds received as a result of purchases through the vending machines 102 directly to the merchant vendor 110.

The merchant processors 106 can be any credit, debit, or gift card processors, such as MasterCard, Visa, American Express, and Discover. The merchant vendor 110 can supply any items, such as soda, snacks, coffee, tea, or any other items. All these items can be placed in the machines 102.

As stated above, one of the problems with prior art cashless vending systems is auditing. This means that it is difficult to get an accurate count for the items sold, remaining, refilled by the merchant vendor 110 (e.g., a route driver employed by the merchant vendor 110), amounts paid be card, cash or otherwise. This is because the current credit card settlement and reconciliation process works well for traditional attended retail point-of-sale systems. However, it does not perform well in the unattended systems, such as vending machines. The reason being is that unlike conventional point-of-sale systems, remote, unattended vending machine routes do not close out cash and card funds at the same time. As such, the merchant vendor 110 is unable to audit its vending machine systems accurately because of irregular settlement and reconciliation processes. The present invention provides solution to this problem, as will be discussed below. The following is a discussion of some conventional system for reconciliation and settlement of accounts.

FIG. 2 illustrates a conventional system 200 for closing of cash and credit card transactions at a retail store, i.e., an attended point-of-sale environment. The system 200 includes a credit card terminal 202 and a register 204. In the shown system, the credit card terminal 202 and the register 204 are accounted for at 10 PM on each day of the week. The amounts from the register (PAPER $) and amounts from the credit card terminal (CARD $) are added up and result in a total amount (TILL $) for that particular day. The system 200 works well in an attended retail environment because the merchant has control over the closing of the credit card terminal 202 and the register 204. In this case, reconciliation of the credit card terminal 202 and register 204 is simple, because the closing period is the same for all types of transactions. In addition, the cash register can print complete tape of individual transactions including all credit card transactions in a batch. Individual receipts can also be printed.

Figure 3:
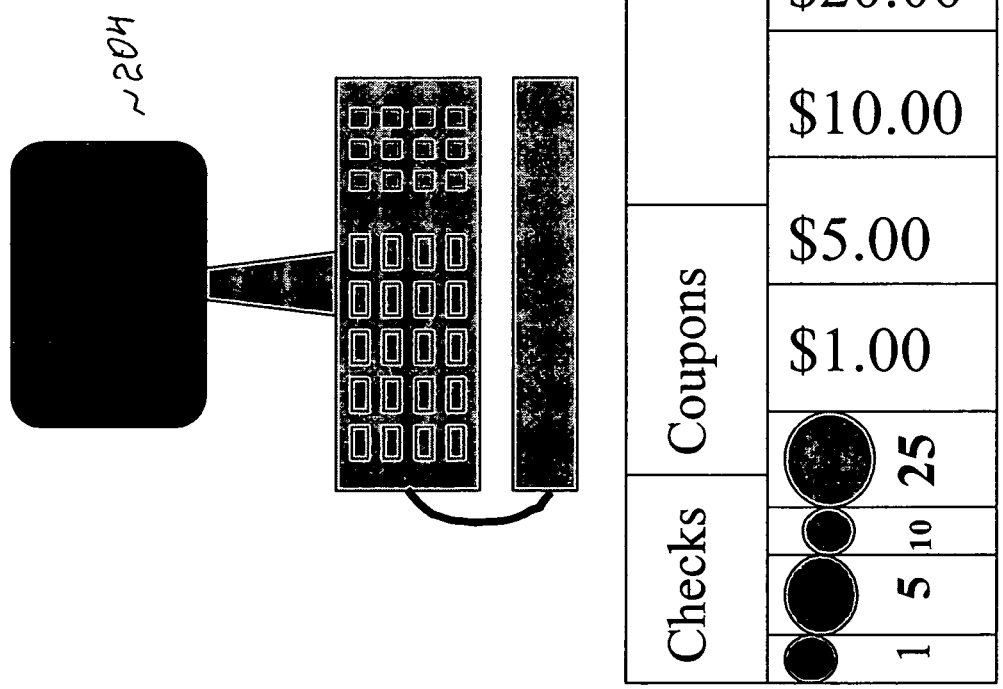
FIG. 3 illustrates a creation of a conventional cash transaction.

A conventional cash transaction is created when a customer purchases an item and pays for it with cash, coins, checks, and/or coupons, as shown in FIG. 3. The transaction, which can include the item purchased, price, and/or amount paid (in cash, coins, checks, and/or coupons) are entered through a keyboard of the register 204 and recorded using a processor of an electronic cash drawer of the register 204. The physical payment is placed in the Till, as shown in FIG. 3.

Figure 4:
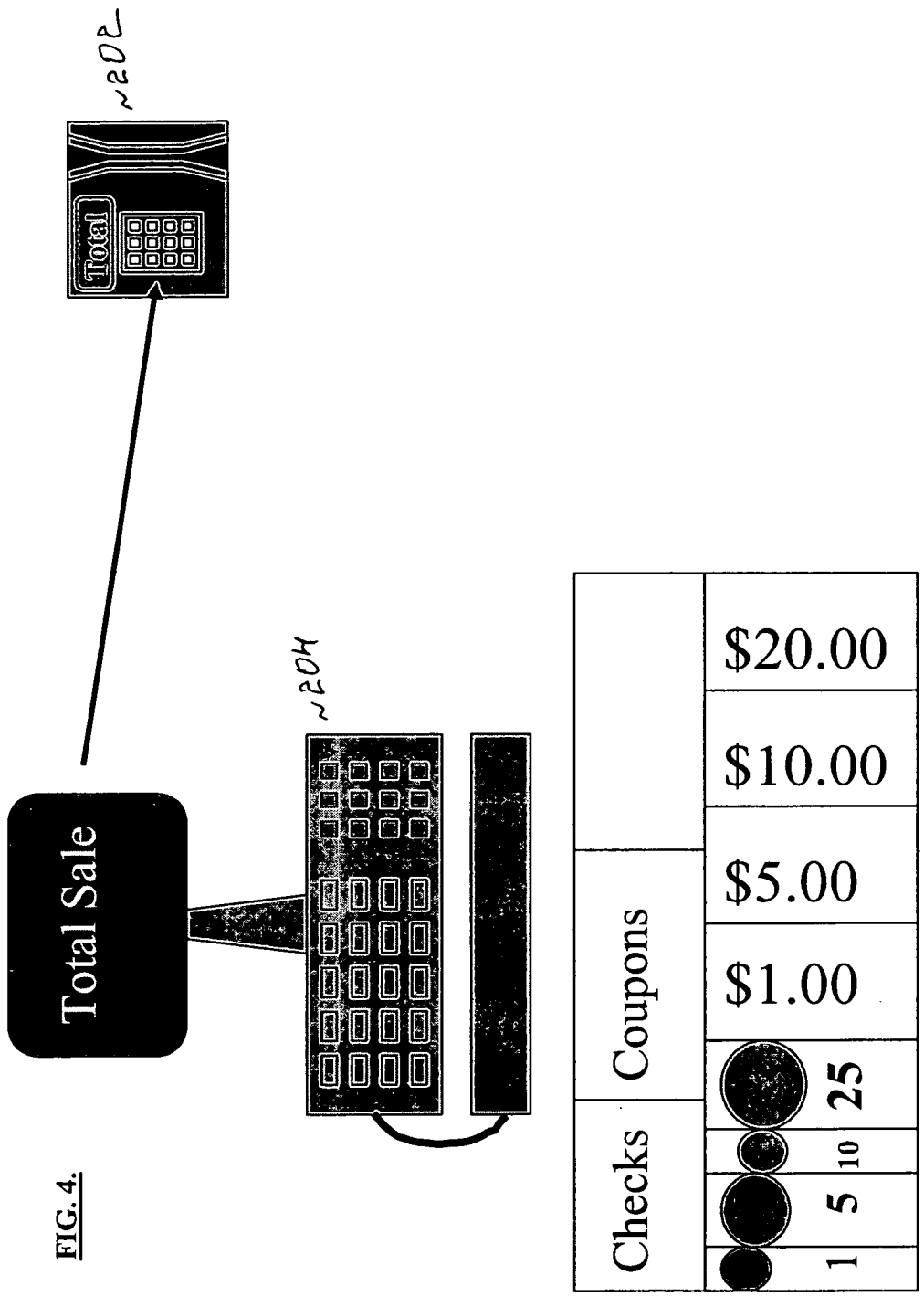
FIG. 4 illustrates a creation of a conventional credit card transaction.

A conventional credit card transaction is created with the customer purchases an item and/or items and the purchase(s) is/are totaled, as shown in FIG. 4. The resulting total value is then keyed into the credit card terminal for electronic authorization.

Figure 5:
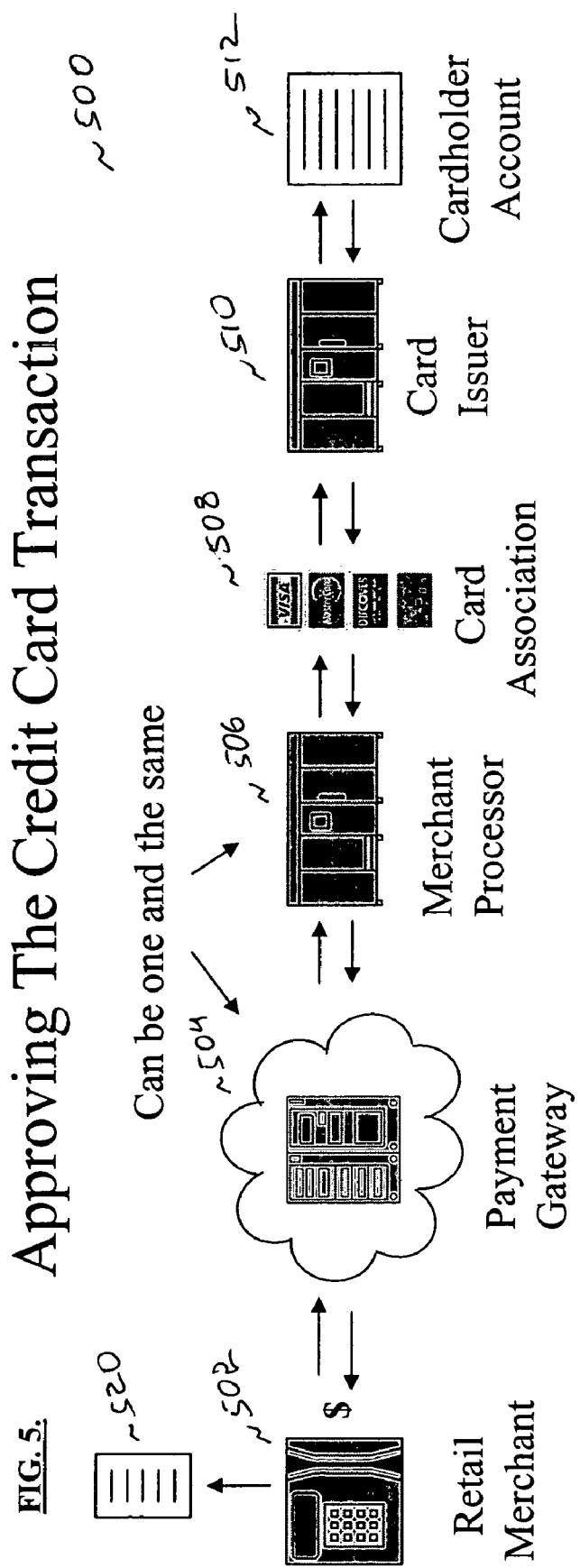
FIG. 5 illustrates a conventional electronic authorization system for an approval of a credit card transaction.
Figure 6:
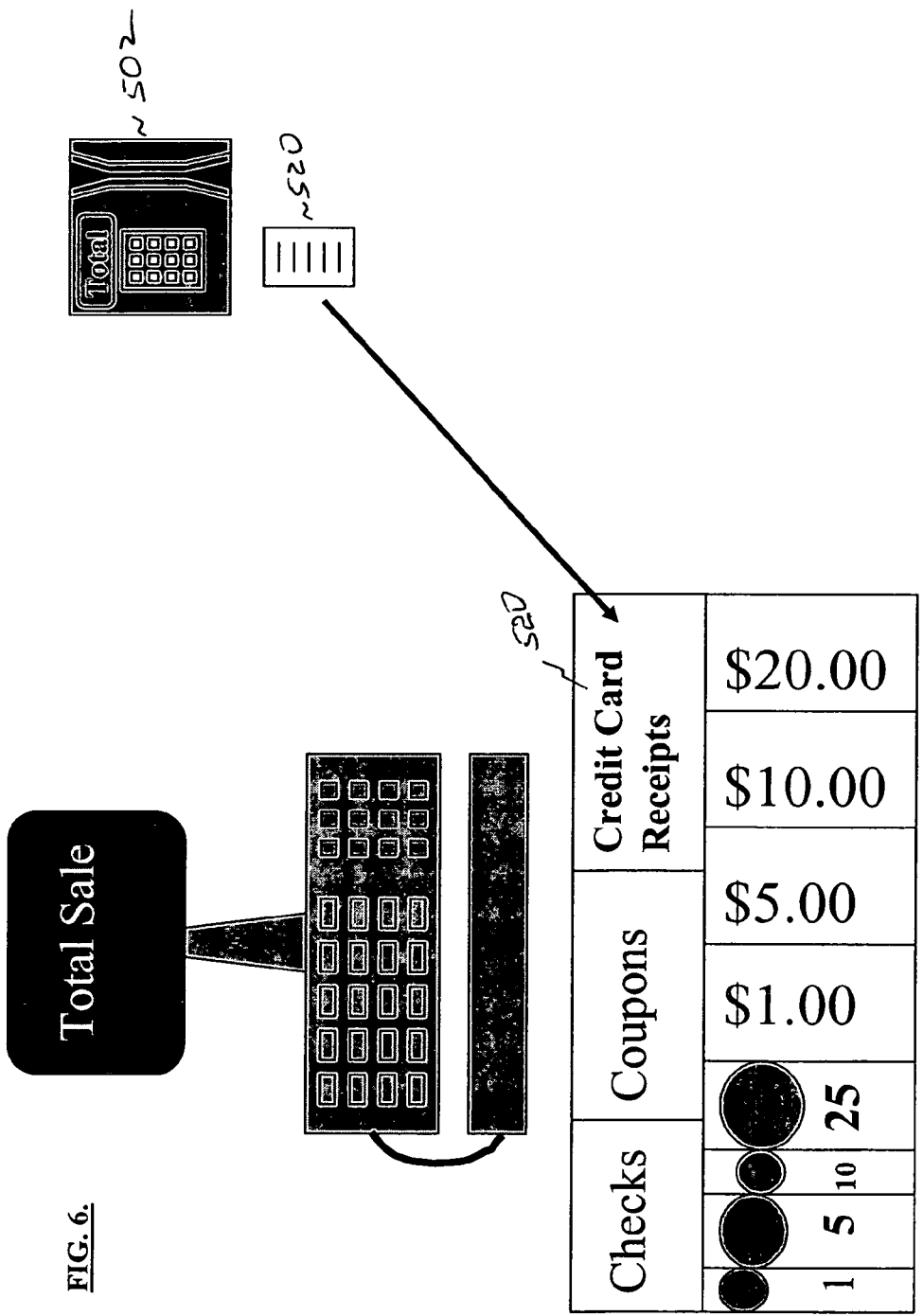
FIG. 6 illustrates collection of credit card receipts in a Till as physical evidence of a transaction.

A conventional electronic authorization system 500 of a credit card transaction is shown in FIG. 5. The authorization process involves retail merchant 502, a payment gateway 504, merchant processor 506, card association 508, card issuer 510, and a card holder account 512. The credit card 520 is presented to the retail merchant 502 as a payment for purchase(s). The transaction information including credit card information (as discussed below with reference to TABLES 1 and 2) is then sent to a payment gateway 504. The payment gateway 504 collects payment information from transactions for a particular merchant or multiple merchants. The payment gateway 504 processes the received data and then forwards it to the merchant processor 506, which, in turn, sends to the card association 508. In an embodiment, the payment gateway 504 and the merchant processor 506 can be incorporated into a single entity. The card association consists of MasterCard, Visa, Discover, American Express, and other types of credit and/or debit cards. The information is then forwarded to the card issuer 510. The card issuer 510 reviews the transaction and, if acceptable, approves it. The card issuer 510 transmits an approval message back to the credit card terminal 502. As result, the credit card terminal 502 prints a receipt 520. The receipt 520 is placed in the Till as a physical evidence of the transaction, as shown in FIG. 6. At this time the credit card transaction is still open and the merchant will not be paid for it until the credit card transaction batch is closed for a particular period, as shown in FIG. 2 above. Once transactions are processed and closed, they appear on the cardholder's billing statement or account 512.

Figure 7:
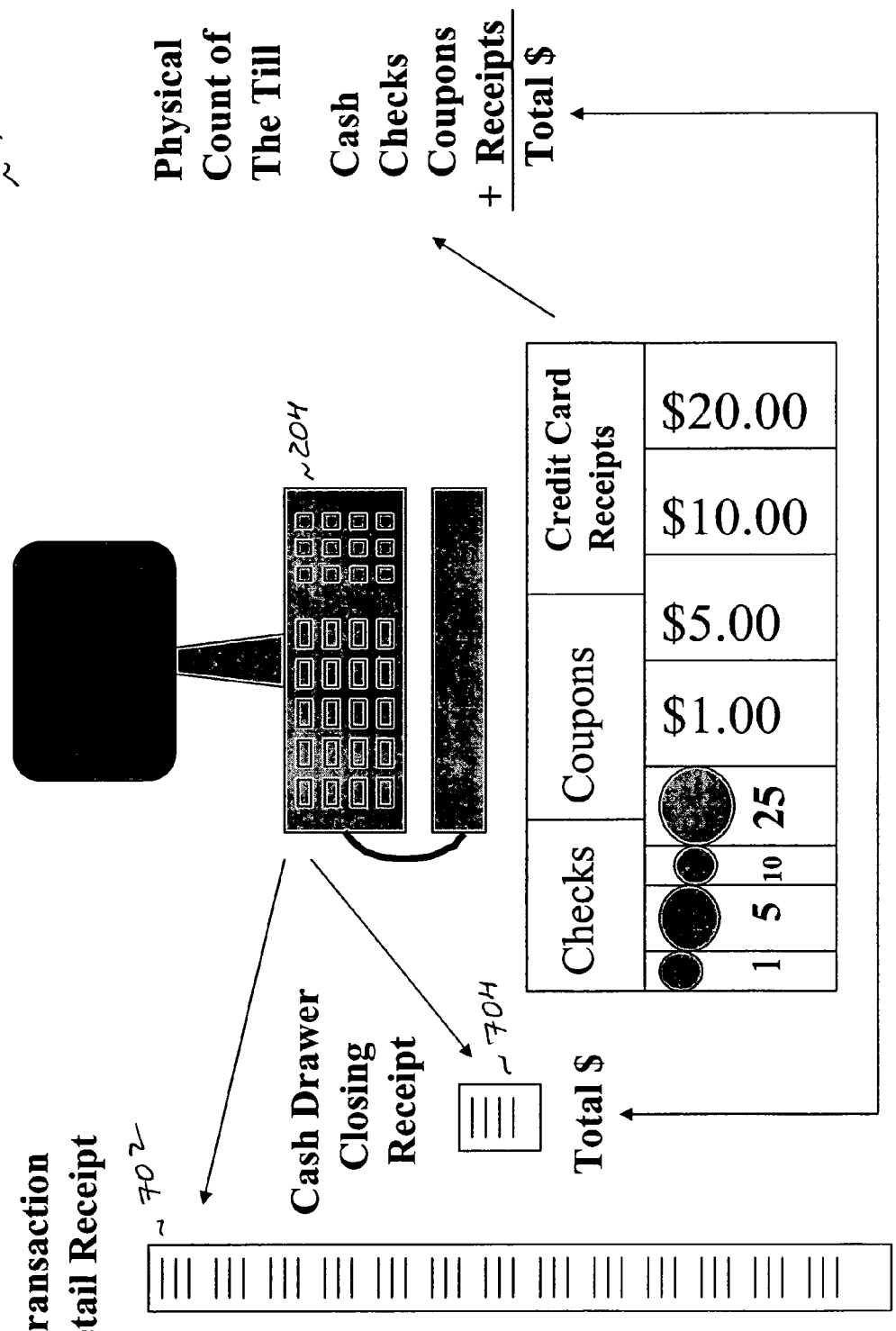
FIG. 7 illustrates a conventional system for closing of a cash drawer in a retail environment.

FIG. 7 illustrates a system 700 for closing a cash drawer illustrated in FIG. 5 above. At a predetermined time (See, FIG. 2 above), the cash register is closed and all transactions are accounted for. The cash register is used to print a transaction detail receipt 702, which provides information about all transactions that occurred in the period between the last predetermined time and the predetermined time. The cash register is also used to print out a cash drawing closing receipt 704 that states a total amount of money (TOTAL $) that was collected during the above period. A physical count of the Till is taken to account for all cash, checks, coupons and credit card receipts. Then, the Till is totaled for the above transaction period. After the Till is totaled, the cash register closed.

Figure 8:
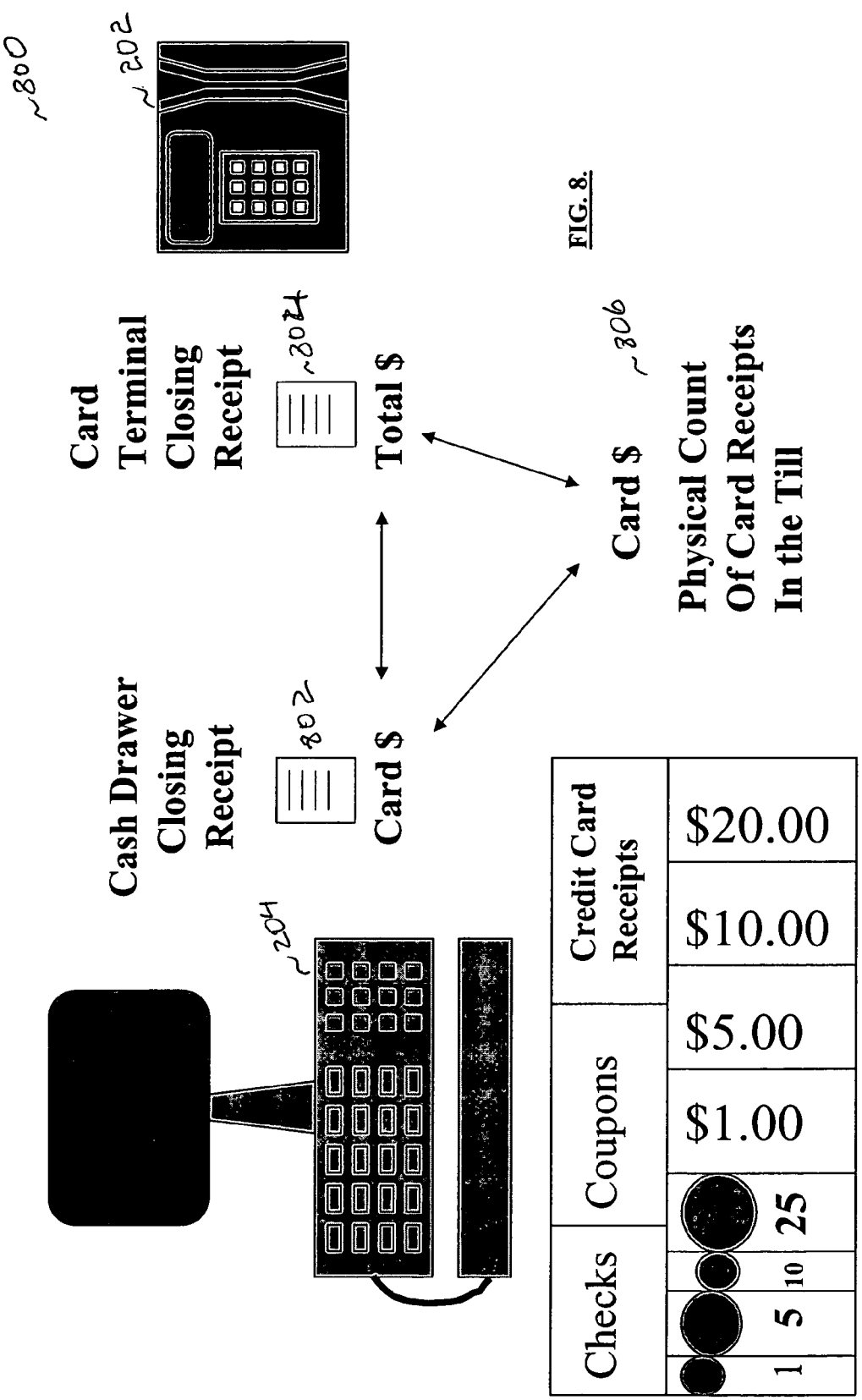
FIG. 8 illustrates a conventional system for reconciliation of a credit card terminal in a retail environment.

FIG. 8 illustrates a conventional system 800 for reconciling a credit card terminal. At the above predetermined time (or any other time), the cash register closing receipt 802 showing an amount paid for purchases using a credit card is printed. The credit card terminal is also used to print a closing receipt 804, which shows the total amount paid for purchases using a card, as entered through the credit card terminal. The credit card receipts in the cash register's Till are counted 806 to determine the amount paid for purchases using the credit card at the above predetermined time. The receipts 802, 804 and counts 806 are compared to reconcile the credit card terminal.

Figure 9:
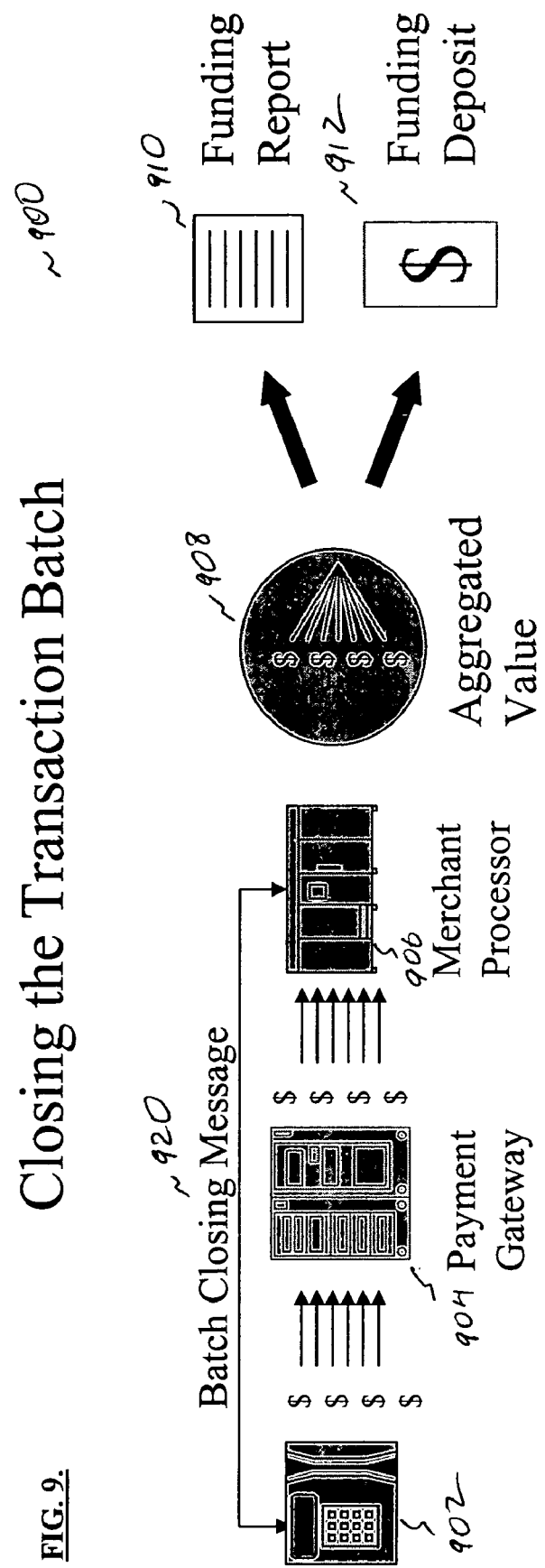
FIG. 9 illustrates a conventional system for closing a transaction batch in a retail environment.

FIG. 9 illustrates a conventional system 900 for closing of a transaction batch. The system includes a credit card terminal 902, a payment gateway 904, and a merchant processor 906. The credit card terminal 902 provides a batch of data containing information regarding multiple transactions using credit card terminal 902 to payment gateway 904. The payment gateway 904 further provides this information to the merchant processor 906. A batch closing message 920 is exchanged between the credit card terminal 902 and the merchant processor 906 when the above batch of data is provided. The merchant processor 904 generates an aggregated value 908 of all transactions based on the batch of data provided. Based on the aggregated value 908, a funding report 910 and a funding deposit 912 are generated. The merchant processor

906 credits the retail merchant (not shown), whose credit card terminal the batch of data came from, for the total net value of the received batch.

A sample funding report 1000 is illustrated in FIG. 10. The funding report includes amounts for gross sales, gross processor fees, gross interchange fees, gross charge backs, and net due merchant. The latter value is calculated based on the other four amounts. In a typical system, processor funding occurs one to two days after the batch has been closed. The processor funding consists of a single net value that is electronically deposited into the merchant's account.

Figure 12:
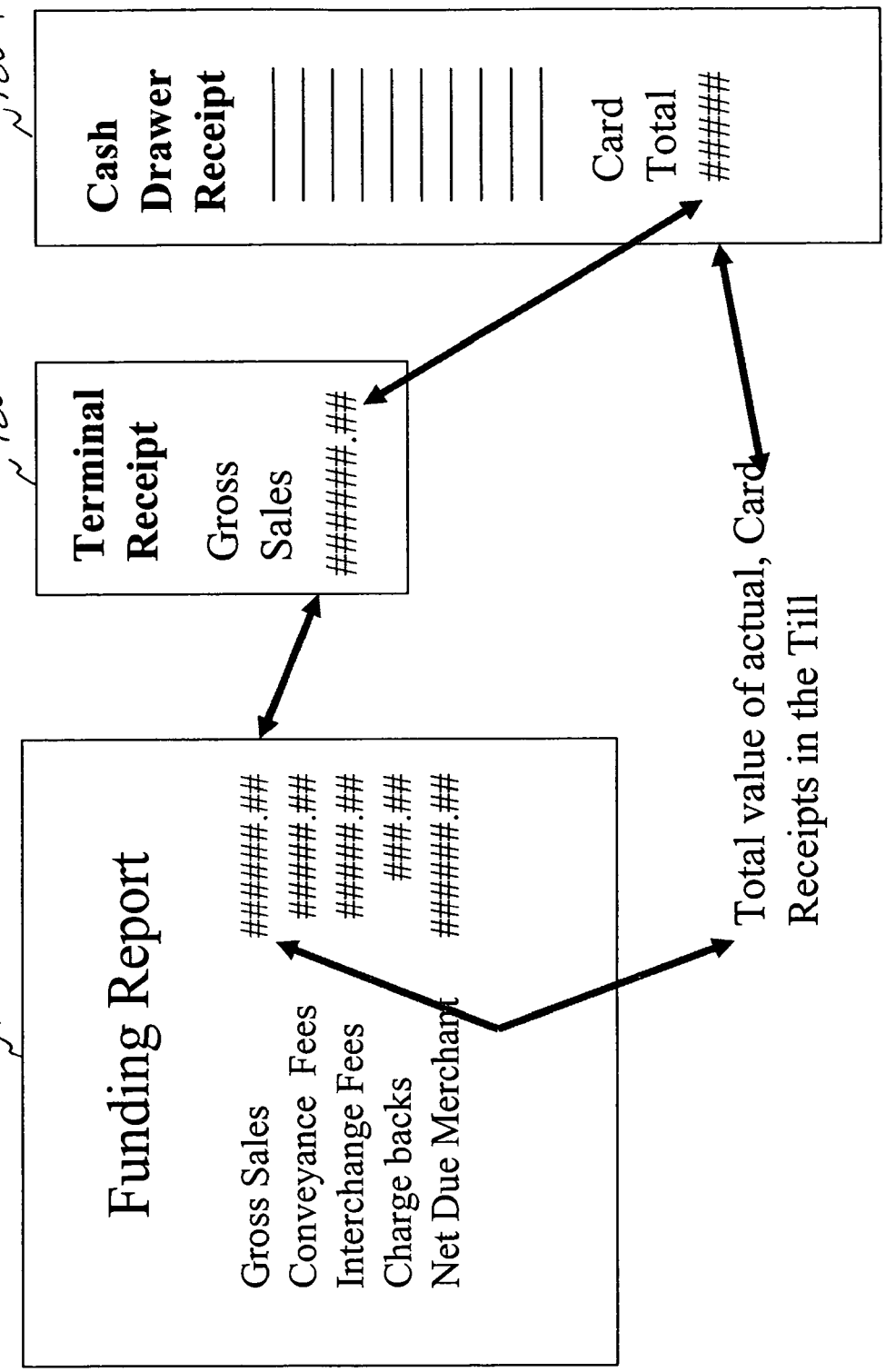
FIG. 12 illustrates a conventional system for auditing of reconciliation documents for cash and credit card terminals in a retail environment.
Figure 13:
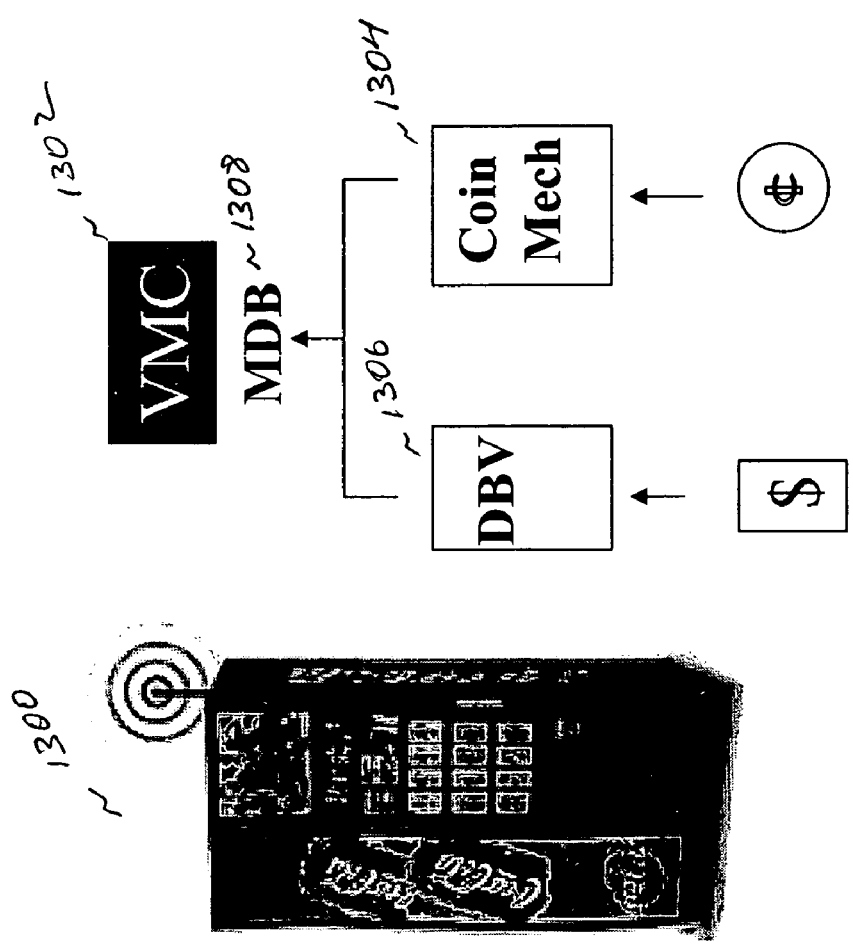
FIG. 13 illustrates conventional "cash" vend transaction using a vending machine.

FIG. 12 illustrates how the gross values in the funding report 1000 are determined. The gross values are determined based on the gross sales information as obtained from the terminal receipt 1202, which are based on a credit card total value and a cash register receipt value, as indicated by the cash drawer receipt 1204. The two values are added up to come up with a total value in the Till, which is then placed in the funding report 1000 as the gross sales value, as illustrated in FIG. 12.

Figure 11:
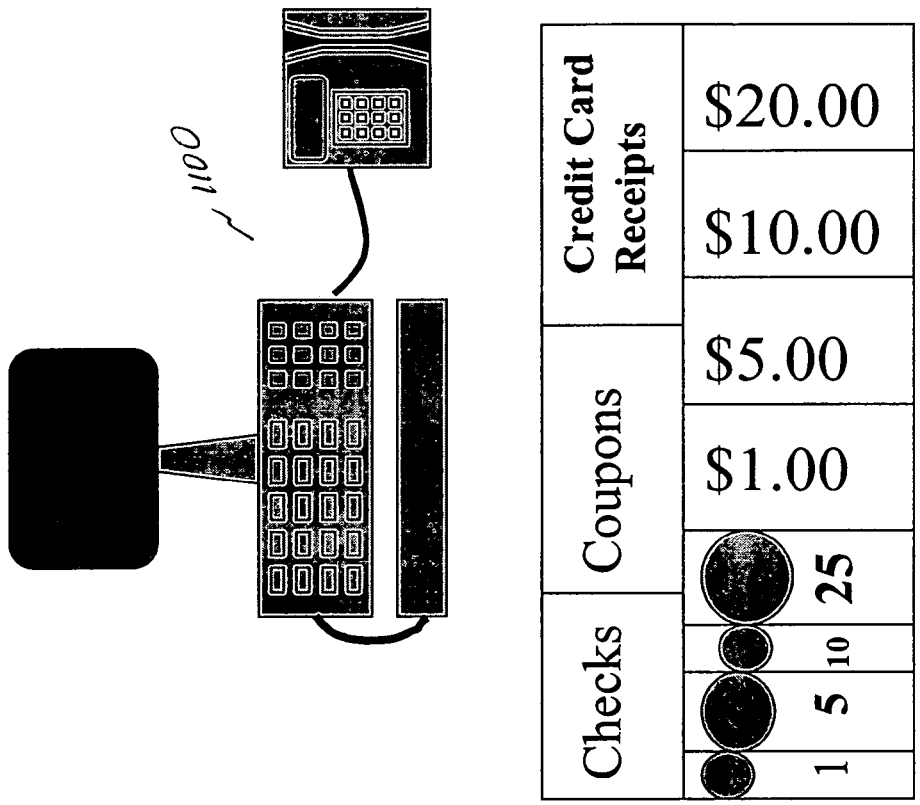
FIG. 11 illustrates a conventional integrated credit card reader.

In the conventional integrated cash-register-credit-card-terminal systems 1100, as shown in FIG. 11, the process of reconciliation works the same way as described above with respect to FIGS. 2-10.

The conventional reconciliation systems work similarly for multiple credit card and cash register terminals. All batch closings for specific merchant's terminals are assigned a single merchant identifier ("ID") and are further aggregated into the same settlement and funding report for a particular period. Once the batches are aggregated, the closing process is the same as described above with respect to FIGS. 2-12. As above, each credit card and/or cash register terminal is capable of printing receipts detailing transactions performed on each terminal.

FIGS. 13-32 illustrate systems for reconciliation and settlement of the vending machine accounts, according to some embodiments of the present invention.

A typical vending machine 1300 includes a vending machine controller (VMC) 1302, coin mechanism (Coin Mech) 1304, a dollar bill acceptor (DBV) 1306, and a multi-drop bus (MDB) 1308. The coins are inserted into the Coin Mech 1304, whereas the bills are inserted into the DBV 1306. The Coin Mech 1304 and DBV 1306 communicate with each other using MDB 1308, which is included in the VMC 1302. A customer wishing to purchase an item from the vending machine inserts coins and/or dollar bills into the respective Coin Mech 1304 and DBV 1306, selects an item for purchase, and the vending machine 1300 vends selected item and dispenses change, if any. The VMC 1302 interacts with the Coin Mech 1304 and DBV 1306 to complete the above vending transaction.

Figure 14:
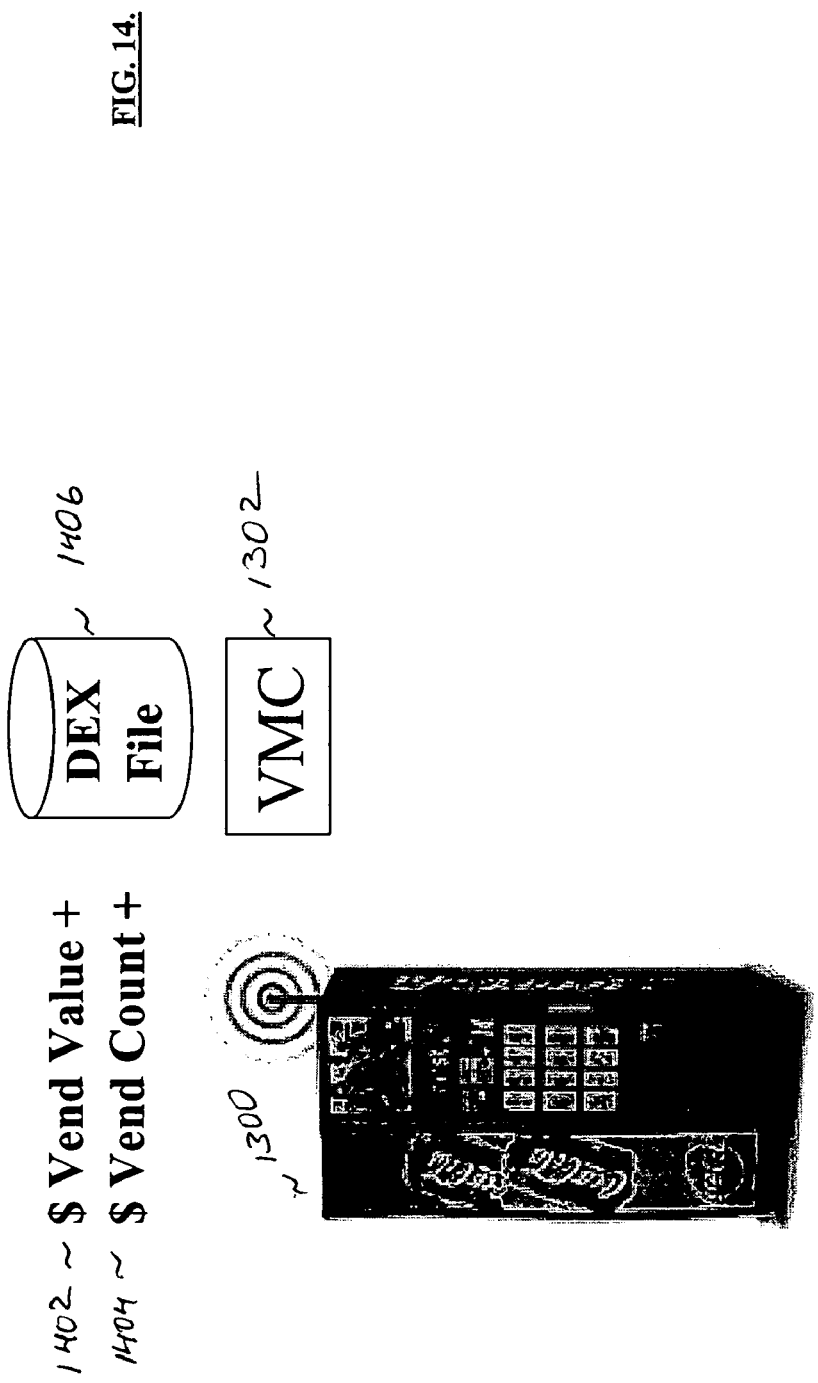
FIG. 14 illustrates a conventional system for recording "cash" vend transaction, shown in FIG. 13, in a vending machine.

The VMC 1302 completes the transaction by incrementing the vending machine 1300's fields for Vend Value 1402 and Vend Count 1404 in the historical data (DEX) file 1406 in the VMC 1302, as shown in FIG. 14. The Vend Value 1402 is the dollar value of the items dispensed in the vending machine. The Vend Count 1404 is the number of items dispensed by the vending machine. Hence, every time a transaction is completed, the Vend Value 1402 and the Vend Count 1404 are incremented. The counts 1402, 1404 are stored in the historical data (DEX) file 1406 of the VMC 1302. Once appropriate increments are made, the individual transaction detail maybe lost.

A route driver, a service technician, a supervisor, or any other person authorized to access the vending machine 1300 can retrieve the DEX file 1406 from the machine. The DEX file 1406 can be retrieved manually using a handheld device that can be connected to the machine 1300. The handheld device reads the DEX file 1406 and stores it in memory for further use in reconciliation and settlement purposes at the vendor. Alternatively, if the vending machine 1300 is equipped with a wireless, wired, wireline or any other transmitter, the DEX file 1406 can be transmitted to the vendor via a network or a communications system.

Figure 15:
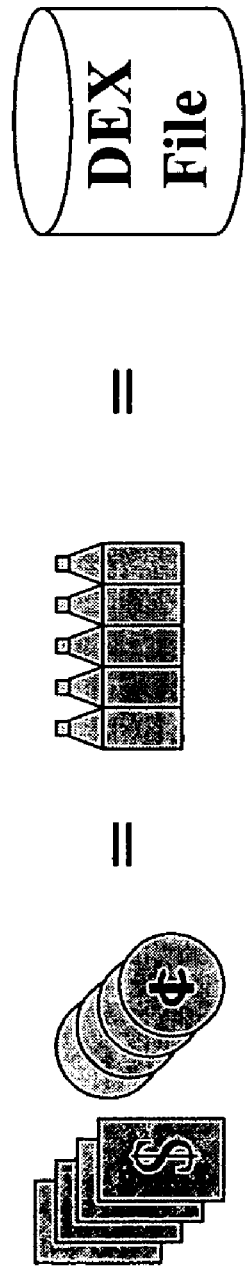
FIG. 15 illustrates a conventional system for reconciliation a vending machine shown in FIG. 13.

Conventional cash reconciliation technique is shown in FIG. 15. Typically, a vending machine is reconciled at the time it is re-filled. This allows the vendor to reconcile coins and bills collected with the cash value of the product added and with the DEX file values (as retrieved by the route driver) for total Vend Value and Vend Count. Thus, as shown in FIG. 15, cash removed by the route driver corresponds to the product added to the vending machine, which further corresponds to the DEX file meter values (i.e., Vend Value and Vend Count).

Figure 16:
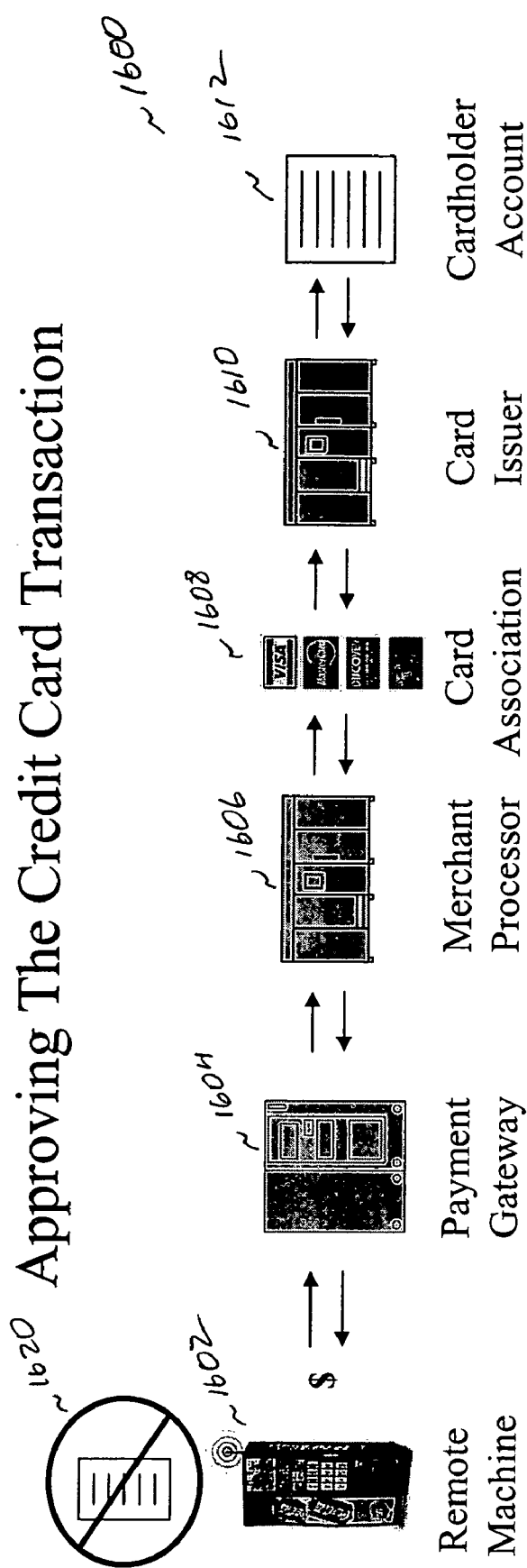
FIG. 16 illustrates a conventional system for approval of a credit card transaction for purchasing items using a vending machine.

FIG. 16 illustrates a system 1600 for approving a credit card transaction performed on a vending machine. The system 1600 includes a remote vending machine 1602, a payment gateway 1604, a merchant processor 1606, a card association 1608, a card issuer 1610, and a cardholder account 1612. A customer, wishing to purchase an item from the vending machine 1602, presents a credit card to the vending machine 1602 and selects an item for purchase. The credit card and item information is sent to the payment gateway 1604, which forwards it to the merchant processor 1606. The merchant processor 1606 routes this information to the card issuer 1610 through a card association 1608. The card issuer 1610 reviews the transaction information and, if it is acceptable, approves it. The approval is sent back through the system to the vending machine 1602. Upon receipt of the approval, the vending machine 1602 vends the selected item. At this time, no receipt is printed, as indicated by 1620, and no transaction detail is recorded in the VMC of the vending machine 1602. The credit card transaction remains open until closing of the batch transactions. Once the batches are closed, the charge made by the customer in purchasing the item appears on the cardholder's account 1612. The machine 1602 does not print a receipt, as indicated by 1620.

Figure 18:
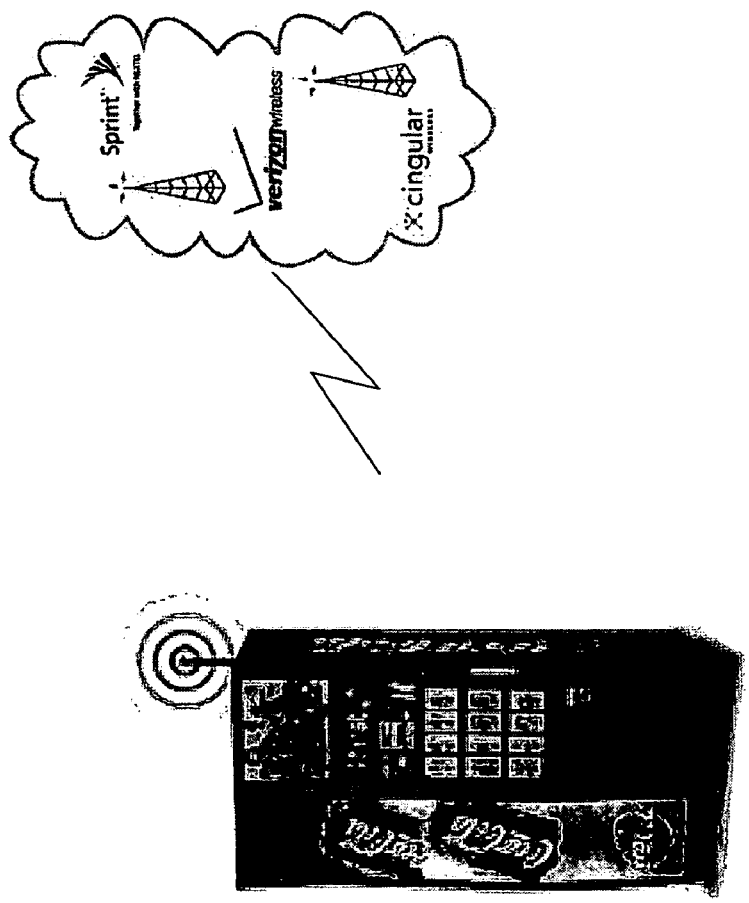
FIG. 18 illustrates a conventional retrieval of a DEX file from a vending machine.

Closing of the batch of transactions is performed when the fields for Card Vend Value 1702 and Card Vend Count 1704 are incremented in the vending machine's DEX file, as shown in FIG. 17. Once counts 1702, 1704 are incremented, the transaction detail is lost. The DEX file is obtained in similar ways as with the cash transactions described above with respect to the FIG. 14. The DEX file can be retrieved by the vendor through a carrier via a communications network as illustrated in FIG. 18. The contents of an exemplary DEX file are discussed below with reference to TABLES 3 and 4.

Figure 19:
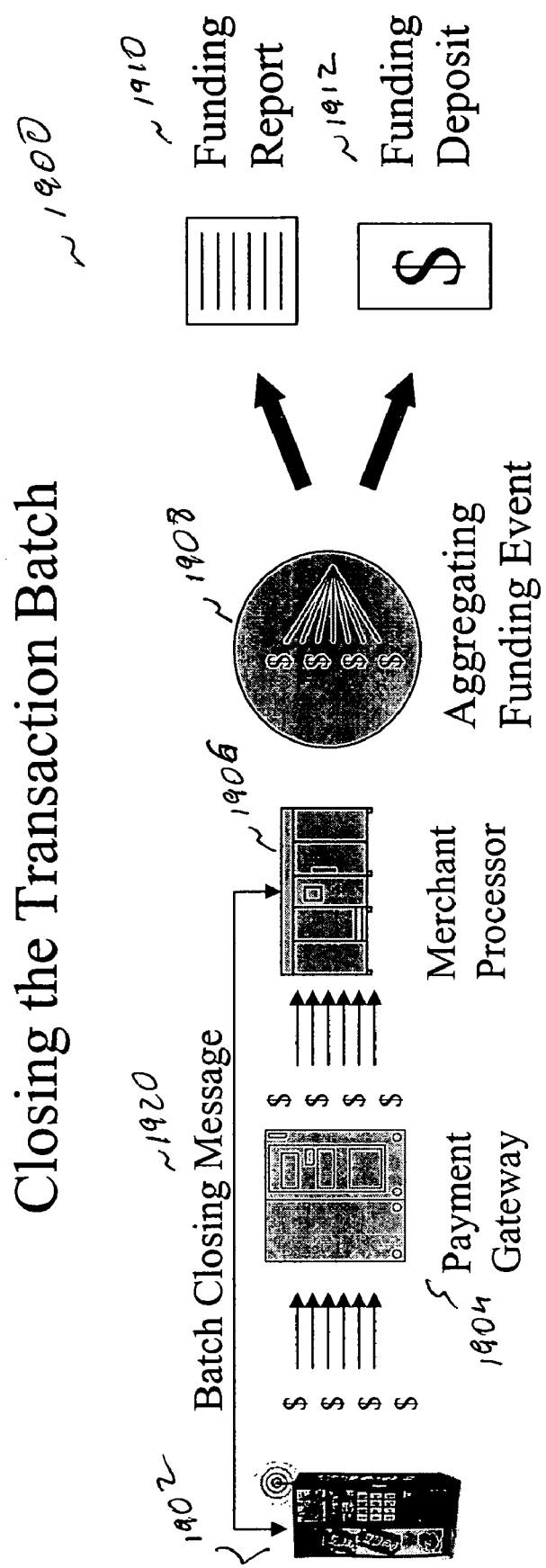
FIG. 19 illustrates a conventional closing of a transaction batch using a vending machine.

A closing of the transaction batch is performed similarly to the closing of the transaction batch described in FIG. 9 above. FIG. 19 illustrates a closing 1900 of transaction batch for a vending machine. Transaction batches can be closed either manually (by a clerk) or automatically (by a merchant processor using an automatic time cut-off). In an embodiment, the automatic closing can be done using a batch closing message that informs a merchant processor 1906 to settle and fund all transactions in the batch. To do so, the merchant processor 1906 aggregates all credit card transactions in the batch into a single funding event and then sends the funding report to explain the actual funding event. At this point all transaction detail maybe lost. Please refer to FIG. 9 for additional detail on closing batch terminals.

Figure 20:
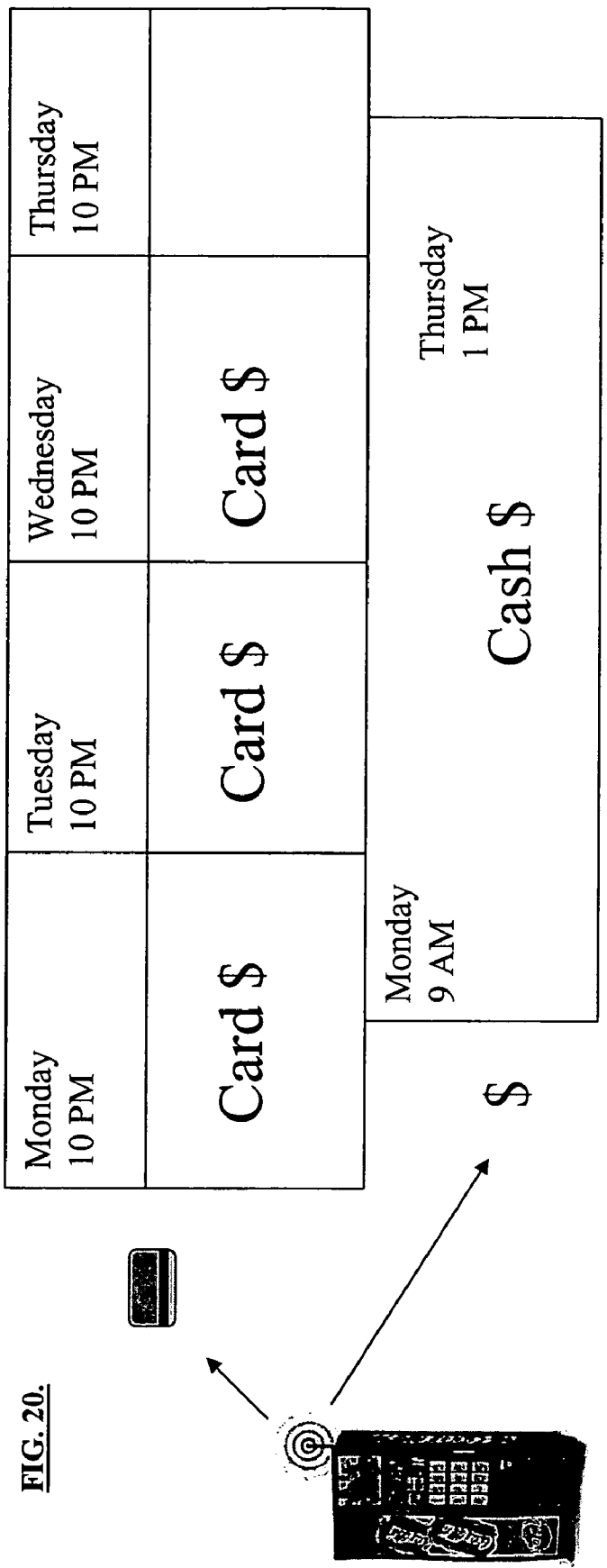
FIG. 20 outlines timing problems with closing of a transaction batch in a vending machine.

There are several issues with respect to the closing and reconciliation of the vending machine accounts, as shown in FIG. 20. The conventional closing and reconciliation process fails in the unattended vending machines environment, where credit card closing occurs at least once a day while cash closings occur at random times across multiple days. This is due to the fact that the machine filled by the route driver at different times, as shown in FIG. 20. As shown, the card closing happens every day at 10 PM, whereas cash closing happens on Monday at 9 AM and then on Thursday at 1 PM. Clearly, the two closings do not coincide, which renders production of accurate reports on settlement and reconciliation for the machine difficult. The vending machine is not capable of printing a detailed receipt of individual transactions, which also complicates accurate auditing.

FIG. 21 is a table illustrating examples of issues associated with timing for closing of cash and credit card transactions, as discussed in FIG. 20 above. The table includes six columns: "Time Period", "Activity", "Machine Card Balance", "Processor Batched Balance", "Operator DEX Balance", and "Over (Short)". The "Time Period" column lists time periods at which various closing of batch transactions is taken. The "Activity" column describes what happened for a specific time period. This can include batch closings, sale of cards, reading of DEX file, etc. The "Machine Card Balance" shows the amounts representing purchases made by the customers using a credit card. Thus, each time there is a purchase of items using a credit card, the amounts are incremented accordingly. As can be seen from the table, the batch for credit card accounts closes every day at midnight. Thus, the "Processor Batched Balance" column is updated after the batch closing at midnight. However, the "Operator DEX Balance" is determined based on the reading of the DEX file on Thursday at 1:10 PM. The balance shown in this column is greater than the batched balance at this time. Thus, a short is indicated in the last column of the table. This is inaccurate because at the time the DEX file is read on Thursday at 1:10 PM, all cash transactions up to that time have already been closed, however, all card transactions remain open and will not be closed until midnight.

Figure 22:
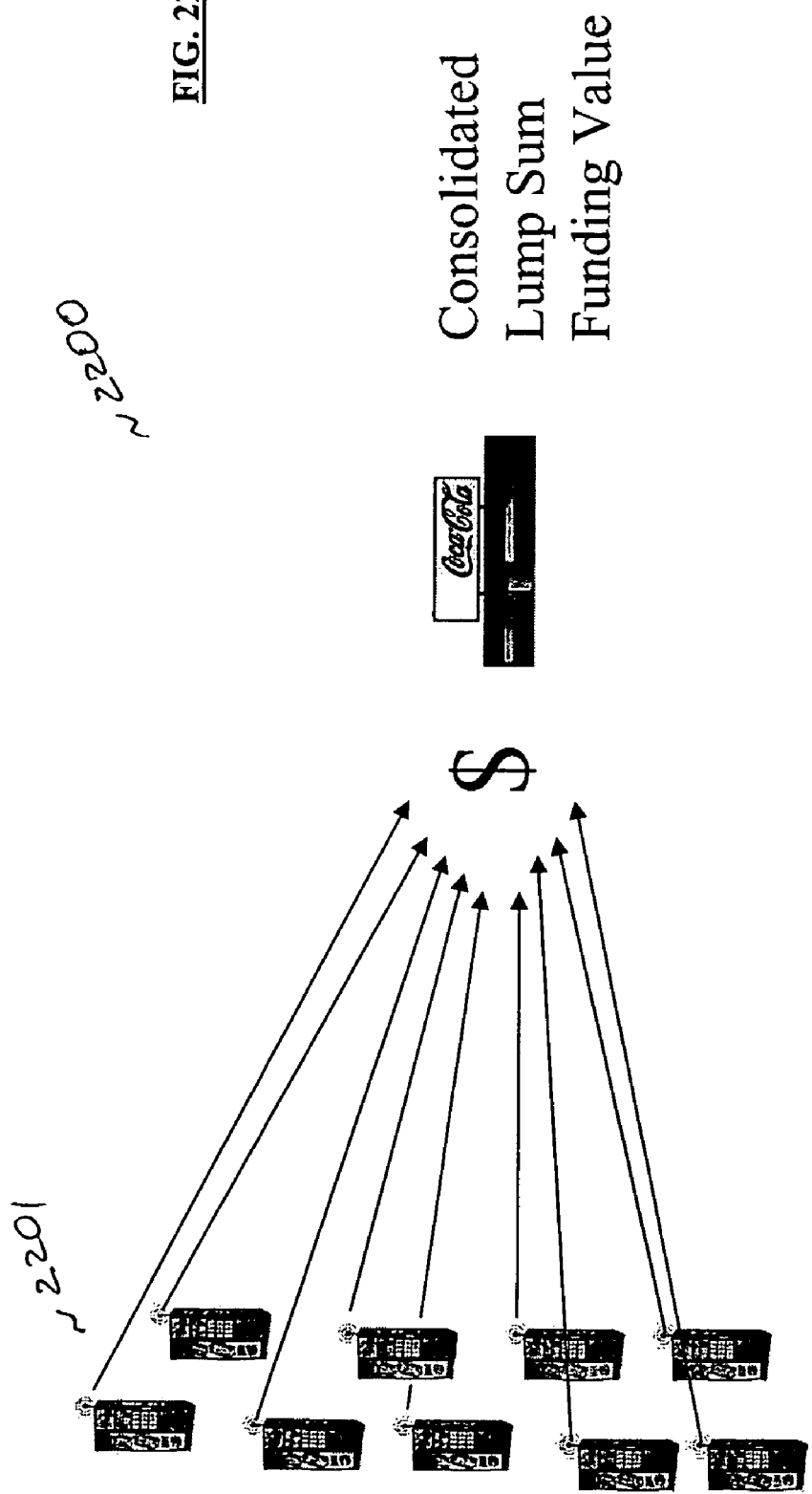
FIG. 22 illustrates a conventional system for aggregation of credit card terminal transactions in multiple vending machines.

FIG. 22 illustrates a system 2200 where multiple vending machines 2201 having credit card terminals are used for aggregation and batch closing. During the batch closing for terminals, a single merchant identification number is assigned to the aggregated vending machines/credit card terminals 2201. As a result of the aggregation of terminals, a consolidated lump sum funding value for a particular merchant is calculated. This value represents a total amount received by the vending machines during a particular closing time period, e.g., a day, a half-day, a week, etc.

Figure 23:
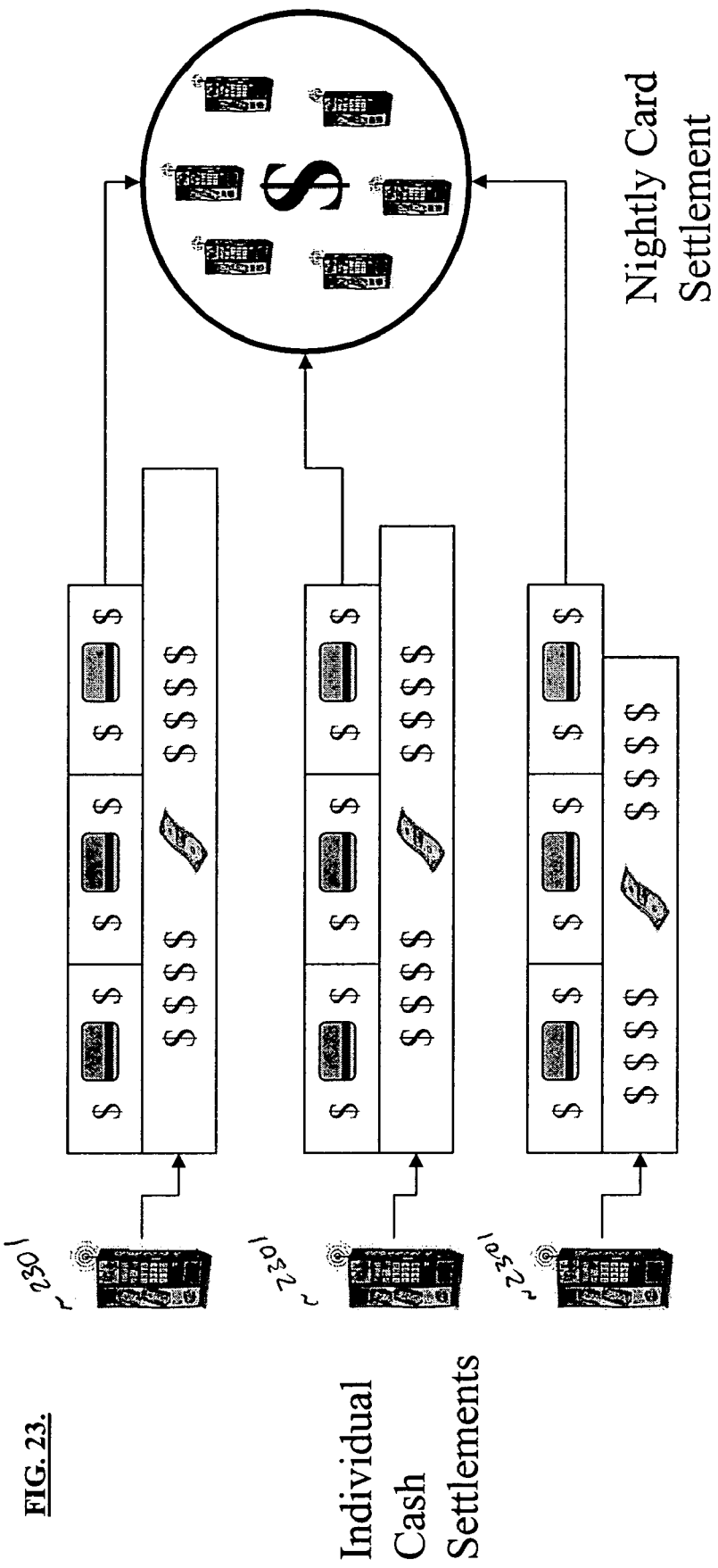
FIG. 23 outlines aggregation and timing reconciliation or settlement problems with multiple vending machines.

FIG. 23 further illustrates aggregation and timing problems with multiple vending machines/credit card terminals 2301. Each vending machine 2301 has individual cash settlements that are taken at the time the route driver reads the DEX file and refills the machine. The credit card settlements are read by the merchant processor at a predetermined time, where the reading produces timed card settlements (e.g., nightly card settlements). As such, in the conventional systems, assignment of a single merchant identification to multiple vending machines closings in addition to a delay in closing cash accounts presents a problem with accurate closing of accounts as illustrated in FIG. 21.

Some embodiments of the present invention allow for alignment of random cash settlement periods with the daily or predetermined credit card closings. One embodiment of such alignment is a use of an independent sales organization ("ISO") factoring. An alternate embodiment of such alignment is a direct processor settlement with detailed reconciliation reporting through an Intelligent Payment Gateway.

Figure 24:
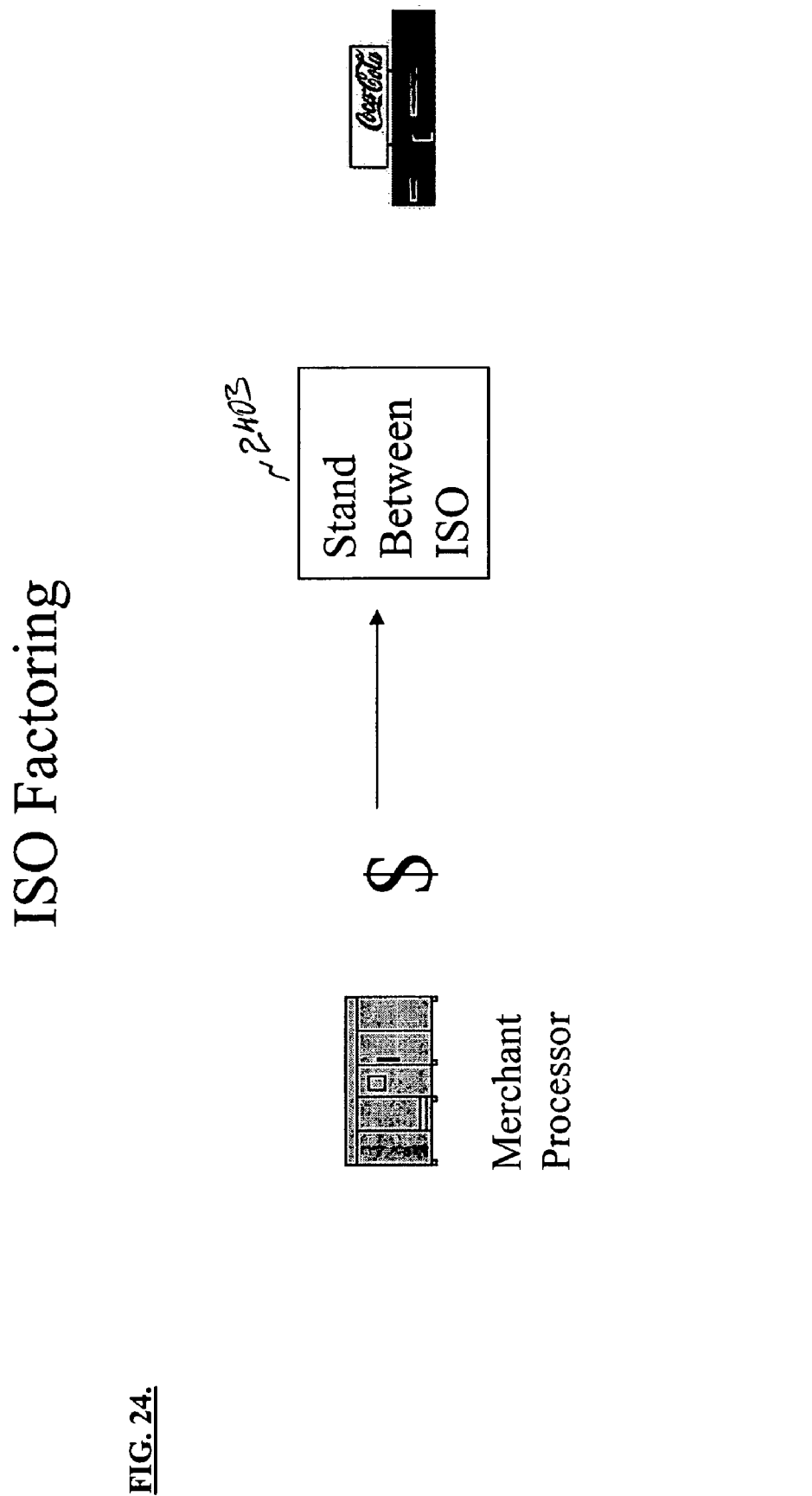
FIG. 24 illustrates an exemplary independent sales organization ("ISO") factoring system for reconciliation and settlement of vending machine, according to the present invention.
Figure 25:
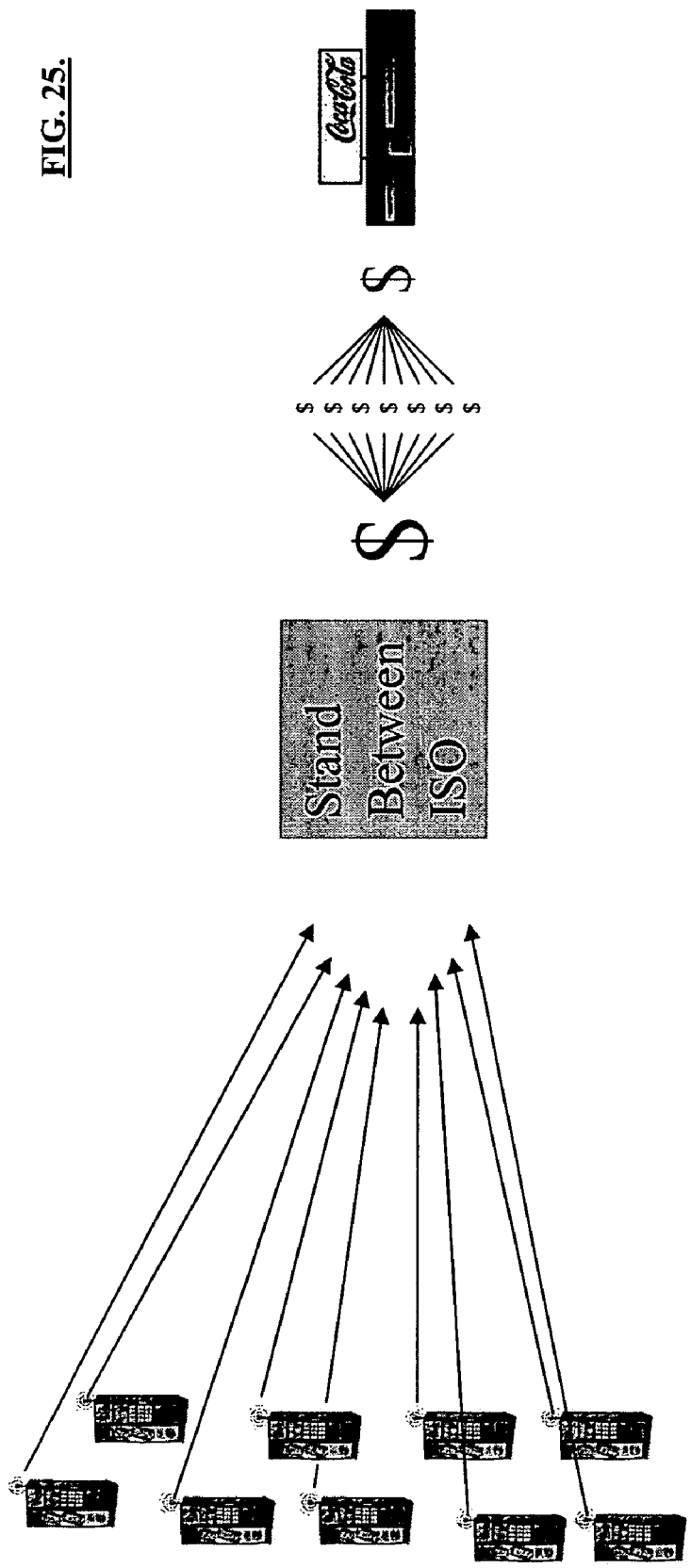
FIG. 25 illustrates an exemplary ISO factoring system for aggregation of credit card terminal transactions in multiple vending machines, according to the present invention.

In the ISO factoring embodiment, a third party organization, such as an ISO, stands between the merchant processor and the route operator, as illustrated in FIG. 24. The ISO 2403 intercepts a payment due to the operator and holds the funds. However, the ISO does not assign individual transactions to the vending machines, where the transactions took place. Instead, the ISO waits for notification that a vending machine has settled its accounts and then uses an internally generated machine value, such as a DEX meter or an internal transaction monitoring system to determine the gross value of the card purchases made between fills, as illustrated in FIG. 25. The ISO's machine value is used in lieu of the actual merchant processor settlement to calculate funds owed by the ISO to the route operator. However, because ISO lacks the ability to assign individual credit card transactions processing fees back to the vending machines in which they occurred, the ISO cannot pass on actual transactions costs to the route operator. Instead, the ISO takes a weighted average of all transaction processing fees and multiplies them by total transactions in each machine. The ISO uses an artificial value in calculating the final payment. The ISO factoring is advantageous for smaller vending operators.

However, there are several issues with the ISO factoring such as:
1) it locks the route operator into a financial relationship with a middle man;
2) it costs the route operator the float on card funds;
3) it puts the route operator funds at risk with a non-bank entity;
4) it may violate card association rules;
5) processor fees are based on averages and estimates rather than actual fees;
6) there is no way to review and control processor costs;
7) it may violate accounting guidelines under Sarbanes-Oxley Act;
8) it is not scalable;
9) the route operator loses a significant level of control over cashless vending;
10) it is generally a sloppy accounting.

A solution to ISO factoring is the system 100 having a direct processor settlement with detailed reconciliation through intelligent payment gateway, as illustrated in FIG. 1. The system 100 provides an intermediary between the merchant processor and the vending machines that is capable of creating specialized reporting. The specialized reporting reconciles nightly closings of the credit card terminal in the vending machine with the random closing for the cash settlement of the vending machine.

Figure 26:
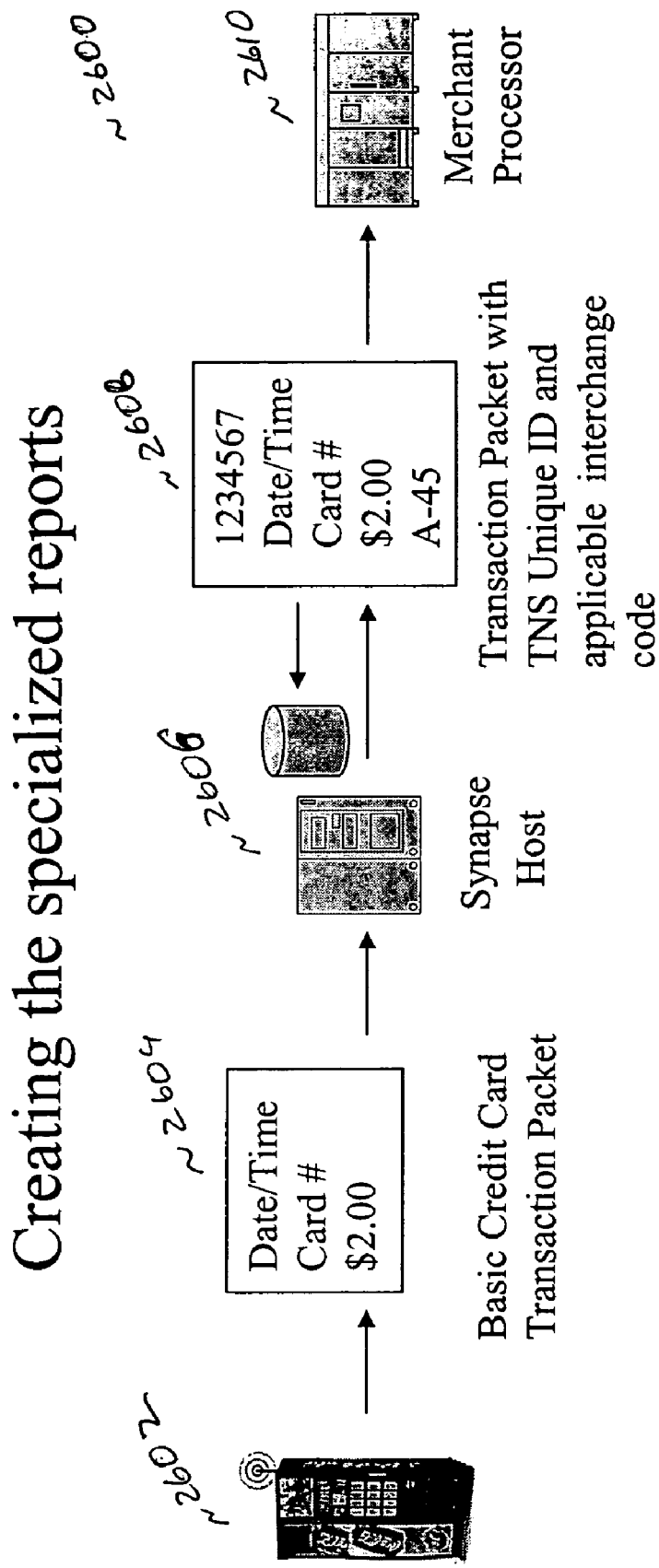
FIG. 26 illustrates an exemplary system for creation of specialized reports in a system for reconciliation or settlement of vending machine accounts shown in FIG. 1, according to the present invention.

FIG. 26 illustrates system 2600 for creating of specialized reports, using system 100, according to the present invention. Once an item is purchased in the vending machine 2602, a credit card transaction packet 2604 is sent to a host 2606. The host 2606 adds a unique identifier to the packet 2604. It also adds a card association qualifying code to each transaction packet before sending it to merchant processor 2610. As such, the transaction packet 2608 with host's unique identifier and applicable interchange code is sent to the merchant processor 2610. The host also stores each transaction with its corresponding interchange qualifying code and host's unique identifier as a record in a transaction database.

Figure 27:
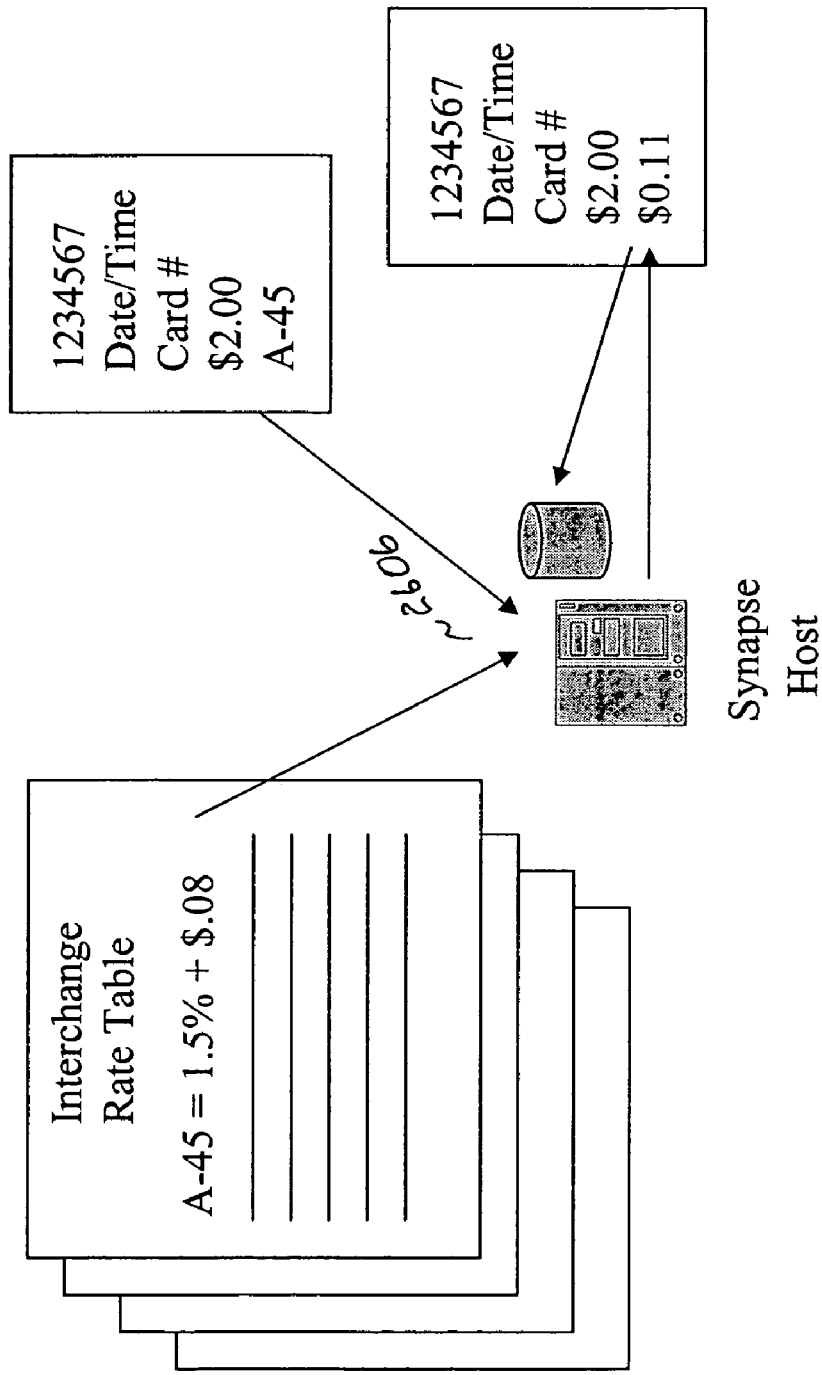
FIG. 27 illustrates an exemplary use of credit card association interchange codes in creation of specialized reports shown in FIG. 26, according to the present invention.

Using the transaction packet 2608 with the host's unique identifier and applicable interchange code, the host 2606 calculates actual interchange value from the rate code category. Such calculation is done based on the rules of the card association interchange process. The actual interchange value is then added to the record in the transaction database. This is illustrated in FIG. 27. The transaction packet 2608 illustrated in FIG. 26 may include the following:

"1234567"—host's unique transaction identifier;
"Date/Time"—date and time of the transaction;
"Card#"—purchaser's credit card number;
"$2.00"—amount charged for the item;
"A-45"—credit card association (Visa, MasterCard, etc.) applicable interchange code (as discussed with respect to FIG. 27). The interchange code determines the fees that the credit card association/issuer of the credit card can charge the merchant for the transaction. Typically, it is a percentage of the purchase price. The interchange code is substituted with the actual dollar amount that corresponds to the code (e.g., A-45=1.5% * purchase price ($2.00)+$0.08=$0.11; See, FIG. 26).

Figure 28:
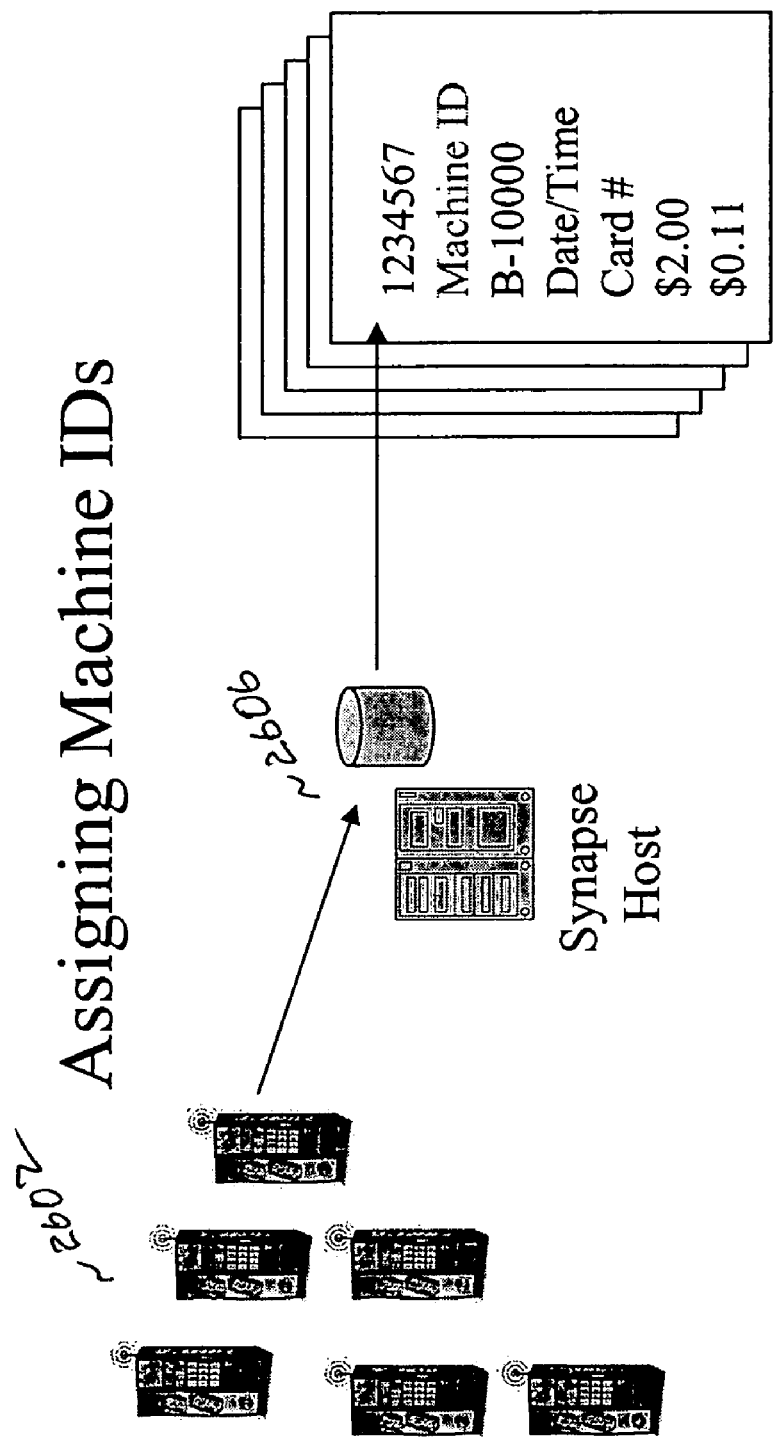
FIG. 28 illustrates an exemplary system for assigning machine identifiers (ID) to transactions from multiple vending machines, according to the present invention.

The host 2606 also associated a specific vending machine Asset identifier number. The host 2606 accesses a stored list of vending machine identifier numbers to associate the origin of the transaction (i.e., the vending machine, where purchase took place) with the vending machine. This is illustrated in FIG. 28. The machine ID is "B-10000".

Figure 29:
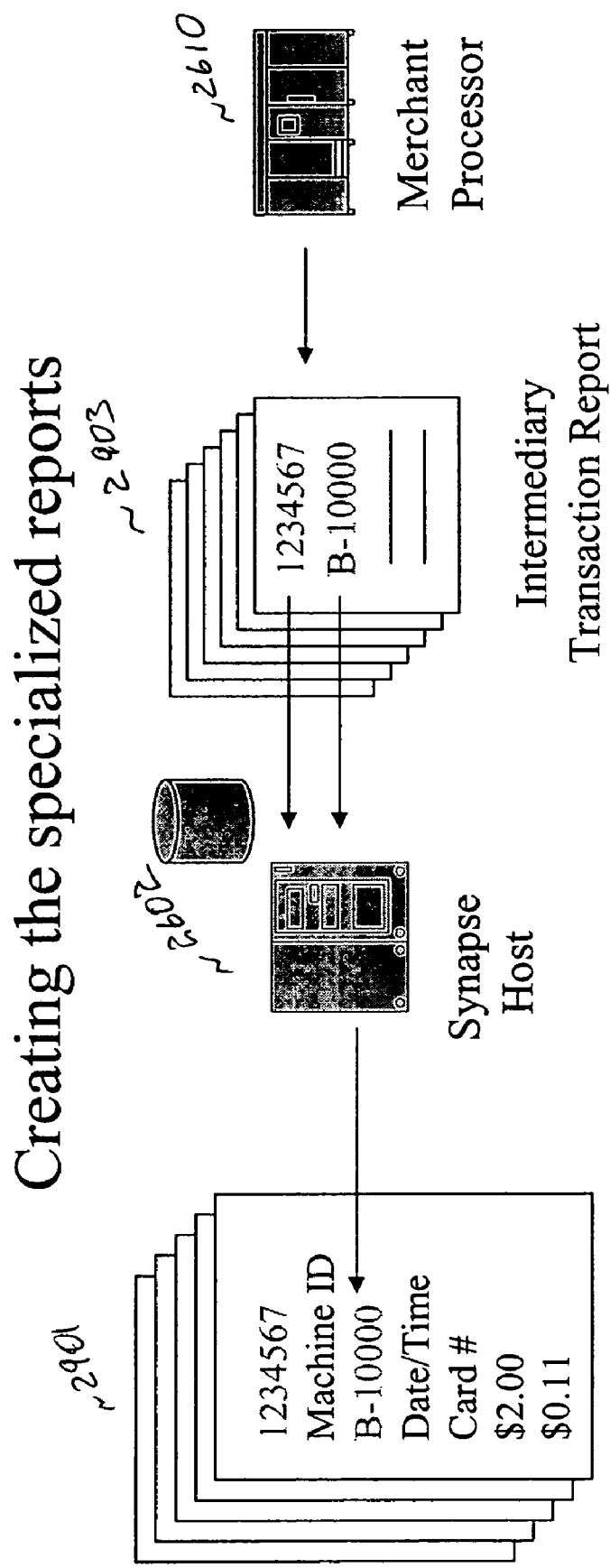
FIG. 29 illustrates creation of an intermediary transaction report for reconciliation or settlement of vending machines, according to the present invention.

The host 2606 also creates a specialized report, as illustrated in FIG. 29. The merchant processor sends the host 2606 a transaction intermediary report 2903. The report 2903 encompasses all transactions that have closed and will be funded against the days during which batch was closed for a specific vending machine. The report is a details individual transaction level and contains a unique host identifier "1234567" for each transaction. The host 2606 can use this report to assign a specific batch closing data to each transaction that is already in the database.

Figure 30:
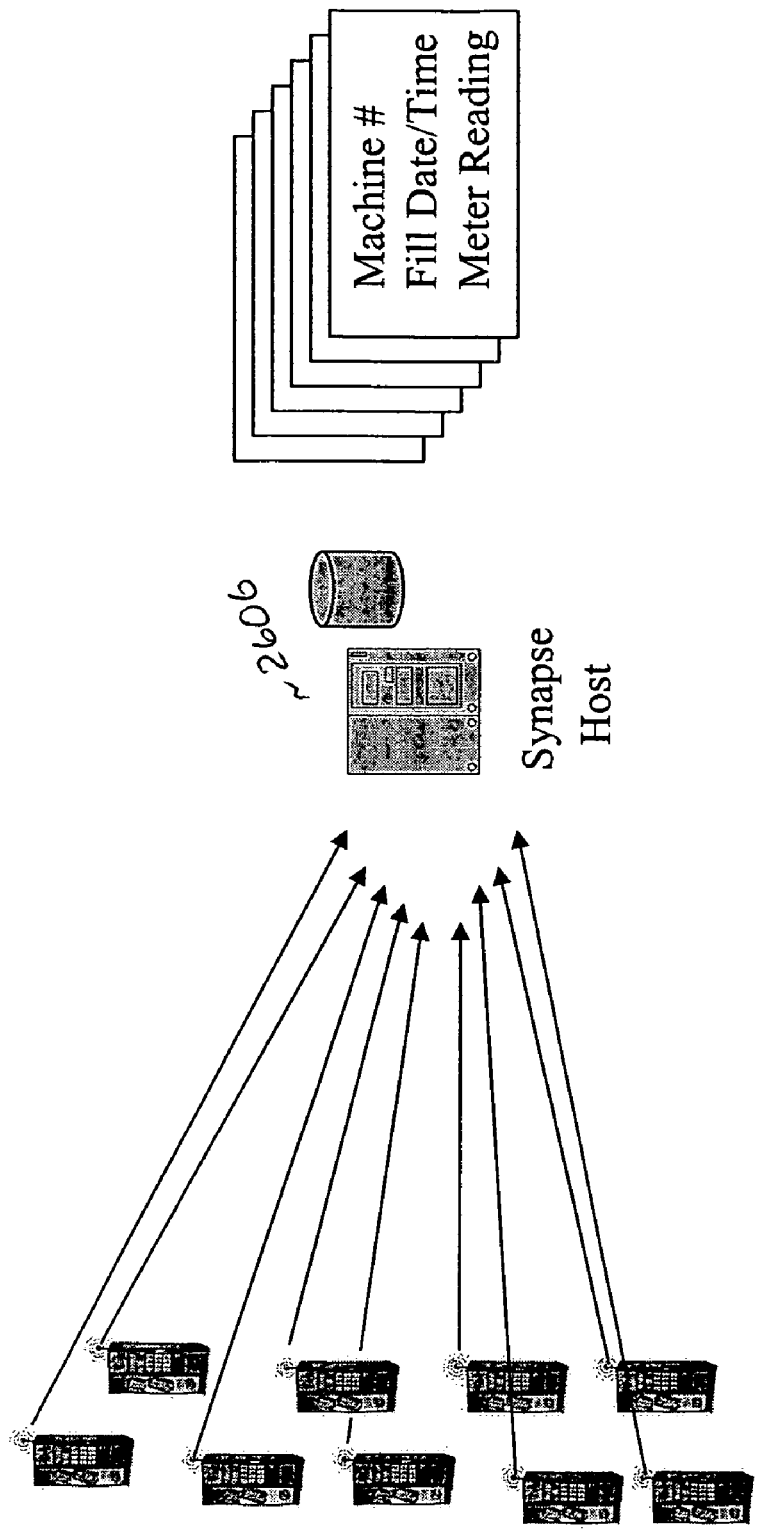
FIG. 30 illustrates an exemplary system for aggregation of credit card terminal transactions in multiple vending machines, according to the present invention.

FIG. 30 illustrates a credit card terminal batch aggregation using host 2606 of the present invention. During route servicing, the route driver swipes a host 2606 driver card in the vending machine, each time the vending machine is filled and the cash is closed out. The swiping triggers the machine to record the time and date of the fill along with the internal meter values for cash and card. This data is then transmitted to the host 2606.

Figure 31:
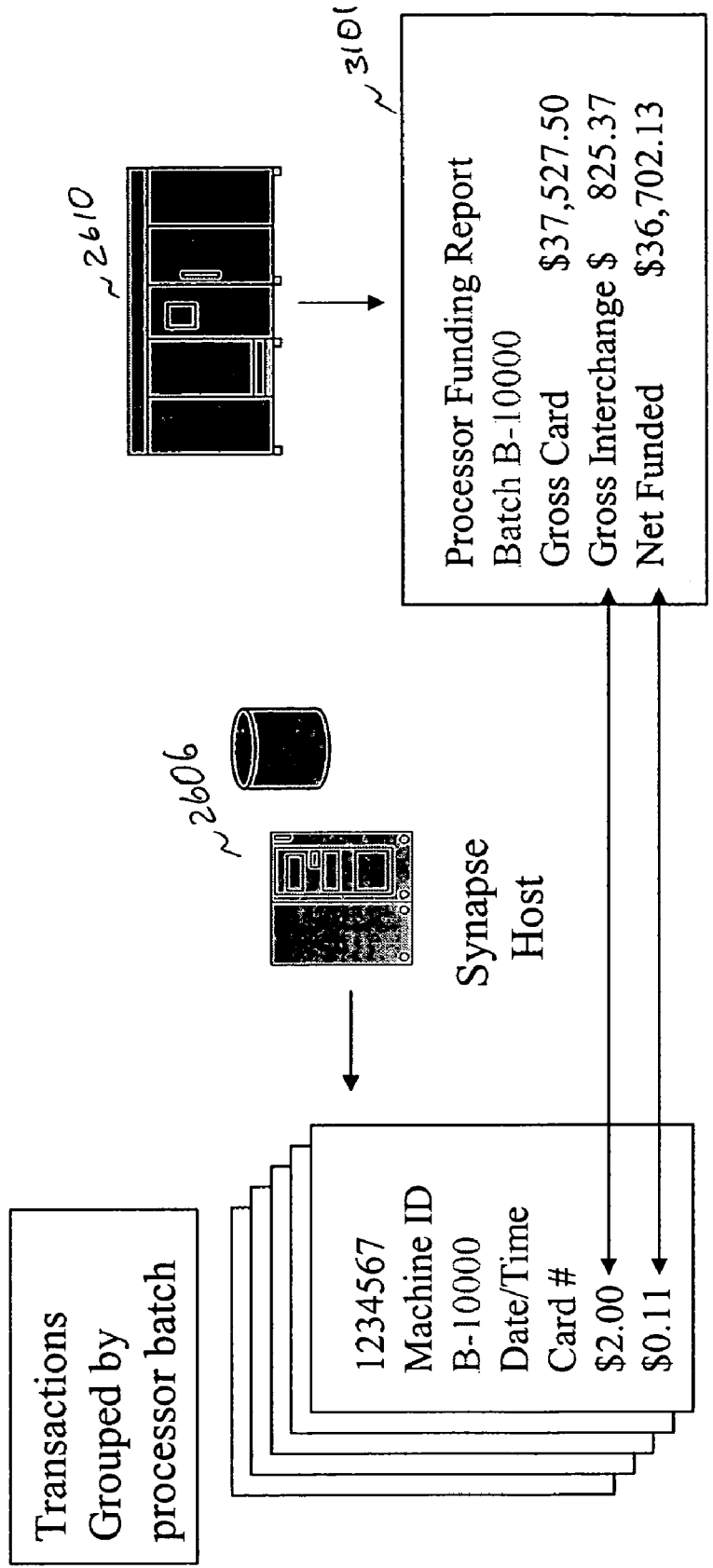
FIG. 31 illustrates an exemplary system for reconciliation of vending machine based on the processor batch funding reports, according to the present invention.
Figure 32:
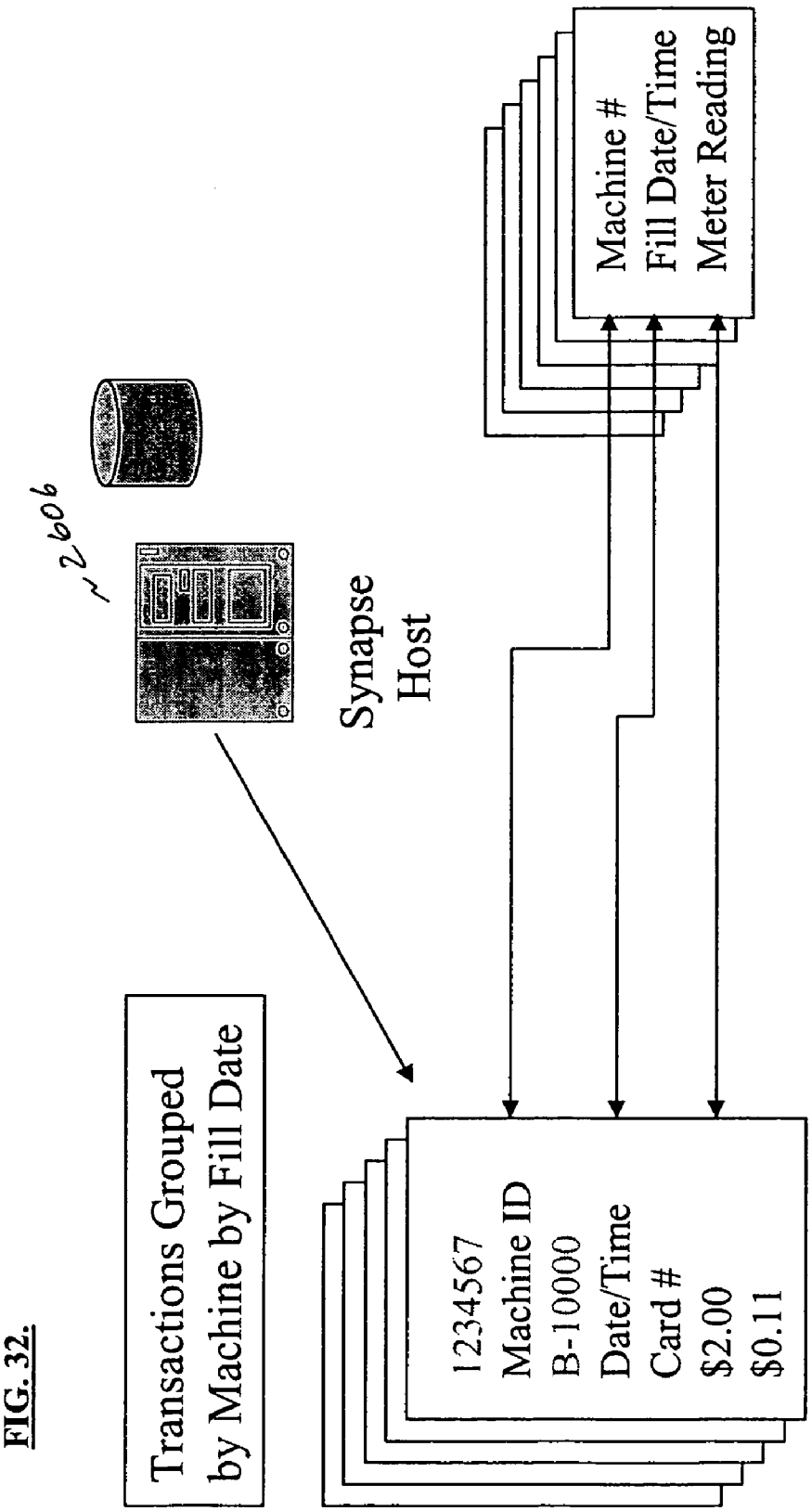
FIG. 32 illustrates an exemplary system for aggregation of interchange values against individual vending machines, according to the present invention.

Transaction values and interchange values are grouped by batch to reconcile against aggregated transactions and aggregated interchange fees. Based on that, the processor funding report 3101 is reconciled, as shown in FIG. 31. Individual transaction values are grouped according to vending machine and fill dates. This allows reconciliation against aggregated machine meter reading in multiple vending machine environments. Individual interchange values are aggregated against individual machines in a similar manner. This is illustrated in FIG. 32.

The reconciliation reports can be sent directly to the vending merchant from the host 2606. Alternatively, the reports can be pulled by the vending merchant from the internet.

In an embodiment of the present invention, the DEX values can be reported as totals covering a random time period, where machine fills do not occur at the same time or date each week. During that period, the card processors continue to close their accounts at a predetermined time each day or in any event do so across a shorter period of time than the period between vending machine fills. In this embodiment, each transaction may be accurately identified: each transaction may be assigned to a specific machine settlement period as set by the driver card so that the machine meters can be reconciled with the total of the card values funded by the card processor.

Further, the card processor interchange fees are assigned to actual vending machines from vending machine fill-to-fill periods for machine audit reporting purposes. Credit card transaction fees vary significantly depending upon the card brand used for a particular transaction. Each of the major card associations (e.g., MasterCard, Visa, American Express, and Discover) have unique schedules for "interchange fees" that apply to each card transaction. Moreover, different types of the same branded credit-card can also have significantly different interchange fees depending upon which category the transaction falls under on the association's schedule. Other card issuers, can also impose specific transaction fees based upon other factors.

The present invention adds a unique transaction identifier ("UTID") for each card transaction it sends to a third party credit clearing processor (and/or a credit vendor) for processing, as stated above. The third party credit processor may then incorporate this UTID into settlement and funding reports sent back to the vending machine host and/or the route operator. The vending machine host may then use the UTID to rearrange transactions (e.g., electronic data management and/or reporting) by at least one of vending machine, by operator and by settlement period (preferably, all three). This information can also be used by the vending machine host in at least one of the following manner.

The information can be used to allow the vending machine host to receive funds from the credit card processor each night and remit funds to a route operator when a route driver conducts a driver-card swipe during settlement. The remittance is preferably a net of a pre-negotiated blended rate for all cards. Accordingly, the operator can reconcile actual card funding with machine meters from machine fill-to-fill periods. As a result, inventory and cash can be accounted for with an audit trail for credit-card transactions from the machine meters to the card processor's funding statements. Moreover, the above-noted method may provide assurance to a bottler/product-supplier of a pre-set rate for any card transaction, thereby removing a point of uncertainty from the process. The vending host preferably uses the actual interchange by machine, by fill period, to accurately audit the system, to insure that the pre-negotiated fees are reasonable and to model the business plan.

The information may also be used to allow the vending host to electronically provide large route operators with the data necessary for the route operators to create their own internal settlement audit tools similar to those described above. This enables a route operator to receive funds directly from the card processor on a nightly basis and reconcile them against a driver-card initiated machine meter (DEX) values.

The present invention also creates an electronic file based reporting system that delivers an electronic data file directly to the accounting system of the bottler home office. This file contains machine meter (DEX) values for cash and credit card sales for each column and/or row in a vending machine with the corresponding price for that column and/or row. This enables the bottler to derive the cash sales by price point needed for a SOX compliant cash accounting system.

This information may also be used to prepare a more generic report, web based or otherwise which gives cash values by price point for each machine from fill-to-fill periods. Such a report will serve the same audit and control function as the above mentioned file.

An exemplary credit card file is illustrated below. The file originates from a server (i.e., computer system) operated by a host processor. The file may be created daily (or at some other interval) and transferred to a vending merchant at a particular time.

File Naming Convention: File name may be named according to any naming convention familiar to one of skill in the art, and may include the date (as well as time) the file is created. The following format may be used:

"yyyy"=numeric year including century (example: 2006)
"mm"=zero padded numeric month (example: 06)
"dd"=zero padded numeric day (example: 07)
"hr"=zero padded numeric hour in military time format (example: 12)
"mi"=zero padded numeric minute (example: 09)
"ss"=zero padded numeric seconds (example: 41)

The file includes credit card transaction gross sales details, and may be in XML format, for example, and may include two sections: a first section may include file description information; and a second section containing data representing credit card transaction (gross) sales. Exemplary Attributes (e.g., XML tags) may include:

TABLE 1

Credit Card Transaction Gross Sales file attributes:

| Short Description | Definition |
|---|---|
| File creation date and time | The exact date and time that the file is created. This assumes a consistent time zone (such as EST) for comparison to other server information. |
| Number of data records (first data section) | The number of records contained in the first data section of the file, which contains the credit card transaction gross sales details. |

TABLE 2

Credit Card Transaction Gross Sales data:

| Short Description | Definition |
|---|---|
| Credit transaction reference number | A masked credit card number identifying individual credit transactions for bank reconciliation and dispute resolution is typically represented as "1234********9876". |
| Date and time of transaction | Date and time of original credit transaction sale request; e.g., exact time (i.e., to the second) and assumes a consistent time zone (such as EST) for comparison to other server information. |
| Merchant Asset Selling Location | A unique identification number that represents the physical location where a merchant vending asset resides. |
| Machine ID (or Radio ID) | A unique identification number for a host processor operated credit card vending enabled device. |
| Vending machine column number | A vending machine beverage column number |
| Vending machine mech rate (vend $) | A vending price for the specific column from which a beverage was purchased. |
| Date and time of row created in database (host processor may ignore this column) | Date and time data is imported to merchant, e.g., exact time (i.e., to the second) and assuming a consistent time zone such as EST for comparison to other server information. |

An exemplary DEX history file is illustrated below. The file originates from a server (i.e., computer system) operated by the host processor. The file is created daily (or at some other interval) and transferred to a vending merchant at a particular time.

File Naming Convention: File name may be named according to any naming convention familiar to one of skill in the art, and may include the date (as well as time) the file is created. The following format may be used:

"yyyy"=numeric year including century (example: 2005)
"mm"=zero padded numeric month (example: 03)
"dd"=zero padded numeric day (example: 09)
"hr"=zero padded numeric hour in military time format (example: 17)
"mi"=zero padded numeric minute (example: 07)
"ss"=zero padded numeric seconds (example: 52)

The file includes vending machine DEX details and may be in XML format and may include three sections: a first section including the file description information; a second section including actual data of individual credit card transactions that were paid or disputed; and a third section containing the actual data of periodic fees, such as cellular wireless fees, at the vending machine level of detail summary only. Exemplary Attributes (e.g., XML tags) may include:

TABLE 3

Vending machine DEX file attributes and/or vending machine DEX attributes:

| Short Description | Definition |
|---|---|
| File creation date and time | Date and time that host creates file, e.g., exact time (e.g., to the second) and assuming a consistent time zone (such as EST) for comparison to other server information. |
| Number of data records (first data section) | A number of records included in the first data section of the file, which contains the DEX details. |

TABLE 4

Vending machine DEX data:

| Short Description | Definition |
|---|---|
| Machine ID (or Radio ID) | A unique identification number for a host credit card vending enabled device. |
| Merchant Asset Selling Location | A unique identification number that represents the physical location where a merchant vending asset resides. |
| Driver card ID number | A number of a driver card. |
| Vended Credit Transaction Summary amount | A total value of credit vends from a vending machine since the last par fill DEX reset. |
| Vended Credit Transaction Summary Count | A total number of credit-card vends from a vending machine since the last par fill DEX reset. |
| Vended Cash Transaction summary amount | The total cash value of a vending machine, since the last par fill DEX reset. |
| Vended Credit Transaction Summary Count | A total number of cash vends for a vending machine since the last DEX par fill. |
| Date and time of asset par fill | Date and time that a driver swipes a driver card during the par filling of an asset, e.g., exact time (i.e., to the second) and assuming a consistent time zone (such as EST) for comparison to other server information. |
| Vending Machine Controller (VMC) serial number | A serial number (unique within a manufacturer) of a VMC device. |
| Subsection XML Tag | Subsection to vending machine column data. |
| Subsection Record XML Tag | Individual column record. |
| Vending machine column number | A vending machine beverage column number. |
| Vending machine mech rate (vend $) | A vending price for the specific column from which a beverage was purchased. |
| Total Value of Column Sales | A value of all vends from this column for the given settlement. |
| Total Count of Column Sales | A count of all vends from this column for the given settlement. |
| Date and time of row created in database (host processor may ignore this column) | Date and time data is imported to a merchant, assuming a consistent time zone (such as EST) for comparison to other server information. |

An exemplary payments and fees file is illustrated below. The file originates from a server (i.e., computer system) operated by the host processor. The file is created daily (or at some other interval) and transferred to a vending merchant at a particular time.

File Naming Convention: Any filing naming convention familiar to one of skill in the art may be used. The file name may include the date and time the file was created, and to that end, may use the following format:

"yyyy"=numeric year including century (example: 2005)
"mm"=zero padded numeric month (example: 03)
"dd"=zero padded numeric day (example: 09)
"hr"=zero padded numeric hour in military time format (example: 17)
"mi"=zero padded numeric minute (example: 07)
"ss"=zero padded numeric seconds (example: 52).

The file includes credit card payments at the transaction detail level and a statement of periodic fees at a vending machine level of detail. The file may be in XML format and may include two sections: a first section including the file description information; and a second section including actual data representing a vending machine's DEX details. Exemplary Attributes (e.g., XML tags), attributable to either or both sections, may include:

TABLE 5

Credit transaction payments, disputes, and miscellaneous fee file attributes:

| Short Description | Definition |
|---|---|
| File creation date and time | Date and time that host processor creates a file, assuming a consistent time zone (such as EST) for comparison to other server information. |
| Number of data records (first data section) | A number of records included in the first data section of the file, which includes credit card transactions actually paid or disputed details. |
| Number of data records (second data section) | A number of records included in the second data section of the file, which includes the periodic summary of fees at a vending machine level of detail. |

TABLE 6

Credit transaction payments and disputes attributes:

| Short Description | Definition |
|---|---|
| Credit transaction reference number | A masked credit card number to identify individual credit transactions for bank reconciliation and dispute resolution. This number may be represented as "1234********9876". |
| Date and time of original credit transaction | Date and time of original credit transaction sale request, e.g., exact time (i.e., to the second) and matching the gross sale to the second, assuming a consistent time zone (such as EST) for comparison to other server information. |
| Merchant Asset Selling Location | A unique identification number that represents the physical location where a Merchant's Vending asset resides. |
| Host ID (or Radio ID) | A unique identification number for a particular host processor credit card vending enabled device. |
| Transaction paid or chargeback flag | An indicator for indicating whether the transaction was paid or charged back (disputed); (e.g.: PID = Paid; CHR = Chargeback) |
| Transaction amount paid or disputed. | An amount actually paid for the transaction. If a transaction is disputed (a charge-back), the amount is a negative number. |
| Transaction fee applied or credited. | An amount of the transaction interchange fee applied to the original transaction. If the transaction fee was credited (e.g., for correction of an error or for a disputed charge-back), the amount is a negative number. |
| Date and time transaction paid or disputed | Date and time at which the credit transaction was processed, e.g., exact time (i.e., to the second) and assuming a consistent time zone (such as EST) for comparison to other server information. |
| Date and time of row created in database (host processor may ignore this column) | Date and time the data is imported to Merchant, e.g., exact time (i.e., to the second) and assuming a consistent time zone (such as EST) for comparison to other server information. |

TABLE 7

Miscellaneous fees attributes:

| Short Description | Definition |
|---|---|
| Merchant vending asset Selling Location | A unique identification number that represents the physical location where a merchant's vending asset resides. |
| Vending asset Host enabled ID (or Radio ID) | A unique identification number for a wireless enabled credit card vending device. |
| Fee amount | A fee amount. |
| Type of fee | A flag indicating the source of the fee (e.g.,: Host = A monthly flat asset rate that a host charges; WIR = A monthly wireless carrier charge that the host passes along to a merchant for each asset; BNK = The summary of a bank/clearing house wire transfer fee totals at a vending asset level). |
| Date and time of fee applied | An ending date and time for which the fee applies, e.g., an exact date/time (i.e., to the second) and assuming a consistent time zone (such as EST) for comparison to other server information. |
| Date and time of row created in database (host processor may ignore this column) | Date and time the data is imported to merchant, e.g., exact time (i.e., to the second) and assuming a consistent time zone (such as EST) for comparison to other server information. |

Although particular embodiments have been disclosed herein in detail, this has been done by way of example for purposes of illustration only, and is not intended to be limiting. In particular, it is contemplated by the inventors that various substitutions, alterations, and modifications may be made to the invention without departing from the spirit and scope of the invention. Other aspects, advantages, and modifications related to the settlement of cashless vending transactions are within the scope of the embodiments of this invention.

What is claimed:

1. A method for reconciling transactions for an unattended vending device, the method comprising:
    creating a transaction data packet having transaction information for a credit transaction carried out on the vending device, wherein the vending device is configured to conduct a credit based vending transaction;
    forwarding the transaction data packet for the credit transaction to a host processor;
    adding a host transaction identifier to the transaction data packet to create a modified transaction data packet for the transaction;
    sending the modified transaction data packet to a merchant processor;
    receiving an interim report from the merchant processor;
    calculating and applying individual interchange values to the transaction using stored rate table values;
    assigning a vending device identifier using the host transaction identifier to the modified transaction packet;
    identifying a correct time and date of a respective machine fill corresponding to the transaction on the vending device;
    forwarding transaction information to a vending device route operator; and
    assigning the transaction to the vending device against a specific fill period for a total card transaction value and a card transaction value net merchant processor and association fees.

2. The method according to claim 1, wherein the interim report includes a transaction information previously received and processed by the merchant processor;
    wherein said transaction information is sent to a credit card association to obtain an associated interchange rate code for use in calculating an association interchange fee for each transaction;
    wherein the transaction is identified with the host transaction identifier.

3. The method according to claim 1, wherein upon a particular vending device being re-filled with products for vending, batch information corresponding to the date of the re-fill and cash and credit totals stored in the vending device are transmitted to the host processor.

4. The method according to claim 1, wherein transaction value and interchange value are stored in a database corresponding to a time period between re-fills, and wherein the transaction value and interchange value are totaled and reconciled against aggregated transactions and aggregated interchange fees.

5. The method according to claim 4, wherein reconciliation is conducted by forwarding the transaction information and associated stored information for the transaction and the vending device to the vending merchant or by the vending merchant accessing such information via a computer network.

6. The method according to claim 4, wherein reconciliation is conducted via a wireless communications network.

7. The method according to claim 4, wherein reconciliation is conducted via a wired communications network.

8. The method according to claim 4, wherein the transaction information further comprises a file containing description of the credit card transaction gross sales data and the credit card transaction gross sales data;
    wherein the file containing description of the credit card transaction gross sales data includes date and time that the file is created and a number of records contained in the file;
    wherein the credit card transaction gross sales data includes a credit card number, date and time of credit transaction sale request, an identification number representing a physical location of the vending device, an identification number for the host processor operated credit card vending enabled device, a column number of the vending device, a vending price, and date and time of when the data is imported to the merchant processor.

9. The method according to claim 4, wherein the transaction packet further comprises information concerning fees associated with the computer network.

10. A method for reconciling transactions for vending devices operated by a vending merchant, the method comprising:
    creating a transaction data packet comprising transaction information for credit transactions carried out on the vending device;
    forwarding the transaction data packet for the credit transaction to a host processor;
    adding a host transaction identifier and an applicable interchange code to the transaction data packet to create a modified transaction data packet for the transaction;
    calculating an interchange amount upon an applicable interchange code being included in the modified transaction data packet from a rate code category for the transaction;
    associating the transaction with a particular vending device using a corresponding vending device identifier;
    storing the transaction information, the transaction identifier, the interchange code, the interchange amount and the vending device identifier for the transaction in a transaction database; and
    assigning a closing date for the transaction.

11. The method according to claim 10, wherein upon a particular vending device being re-filled with products for vending, batch information corresponding to a date of the re-fill and cash and credit totals stored in the vending device are transmitted to the host processor.

12. The method according to claim 11, wherein the transaction value and interchange value stored in the database corresponding to a time period between re-fills are totaled and reconciled against aggregated transactions and optionally against aggregated interchange fees obtained in the batch information.

13. The method according to claim 12, wherein reconciliation is conducted by forwarding the transaction information and associated stored information for the transaction and the vending device to the vending merchant or by the vending merchant accessing such information via a computer network.

14. The method according to claim 13, wherein reconciliation is conducted via a wireless communications network.

15. The method according to claim 13, wherein reconciliation is conducted via a wired communications network.

16. The method according to claim 13, wherein the transaction information further comprises a file containing description of the credit card transaction gross sales data and the credit card transaction gross sales data;

wherein the file containing description of the credit card transaction gross sales data includes date and time that the file is created and a number of records contained in the file;

wherein the credit card transaction gross sales data includes a credit card number, date and time of credit transaction sale request, an identification number representing a physical location of the vending device, an identification number for the host processor operated credit card vending enabled device, a column number of the vending device, a vending price, and date and time of when the data is imported to the merchant processor.

17. The method according to claim 13, wherein the transaction packet further comprises information concerning fees associated with the computer network.

18. A system for reconciling transactions in a plurality of unattended vending devices operated by a vending merchant, the system comprising:

a server operating software having computer instructions enabling:
      receipt of a transaction data packet, the transaction data packet comprising transaction information for credit transactions carried out on a vending device;
      addition of a transaction identifier and an applicable interchange code to the transaction data packet to create a modified transaction data packet for the transaction;
      calculation of an interchange amount from a rate code category for the transaction;
      association of the transaction with the particular vending device using a corresponding vending device identifier;
      storage of the transaction information, the transaction identifier, the interchange code, the interchange amount and the vending device identifier for the transaction in a transaction database; and
      assignment of a closing date for each transaction.

19. The system according to claim 18, wherein upon a particular vending device being re-filled with products for vending, batch information corresponding to a date of the re-fill and cash and credit totals stored in the vending device are transmitted to the host processor.

20. The system according to claim 19, wherein the transaction value and interchange value stored in the database corresponding to a time period between re-fills are totaled and reconciled against aggregated transactions and optionally against aggregated interchange fees obtained in the batch information.

21. The system according to claim 20, wherein reconciliation is conducted by forwarding the transaction information and associated stored information for the transaction and the vending device to the vending merchant or by the vending merchant accessing such information via a computer network.

* * * * *